(12) United States Patent
Barabas et al.

(10) Patent No.: US 7,512,610 B1
(45) Date of Patent: Mar. 31, 2009

(54) PROCESSING DATA RECORDS

(75) Inventors: Albert B. Barabas, Fitchburg, WI (US);
Mark D. A. Van Gulik, Madison, WI (US); Ernst M. Siepmann, Pembroke Pines, FL (US)

(73) Assignee: Miosoft Corporation, Madison, WI (US)

( * ) Notice: Subject to any disclaimer, the term of this patent is extended or adjusted under 35 U.S.C. 154(b) by 501 days.

(21) Appl. No.: 11/241,571

(22) Filed: Sep. 30, 2005

(51) Int. Cl.
*G06F 17/30* (2006.01)
(52) U.S. Cl. .............................. 707/100; 707/1; 707/102
(58) Field of Classification Search .................. 707/100, 707/102, 1
See application file for complete search history.

(56) References Cited

U.S. PATENT DOCUMENTS 6,037,938 A 3/2000 Wolké ........................ 715/784
6,236,986 B1 5/2001 Gestrelius et al. .............. 707/3
7,216,132 B1 * 5/2007 Flam .......................... 707/200
7,310,635 B2 * 12/2007 Tucker .......................... 707/3

* cited by examiner

*Primary Examiner*—Cheryl Lewis
(74) *Attorney, Agent, or Firm*—Fish & Richardson P.C.

(57) ABSTRACT

Among other things, a user is enabled to identify arbitrary data records of interest that belong to a file of data records that are expressed in an arbitrary format. Pre-generated information about the records of the file is used to enable a user to view a portion of the arbitrary data records that a machine is capable of displaying at one time. The amount of time required to enable the user to view the portion after the data records of interest have been identified is essentially independent of the number of records in the file. The file and the pre-generated information about the records of the file are each too large to be stored, as a whole, in a memory that is used by the machine in accessing the arbitrary data records in response to the user's identification of records of interest.

82 Claims, 27 Drawing Sheets

Figure 2

Sorted-counts-and-values 380

Figure 1:
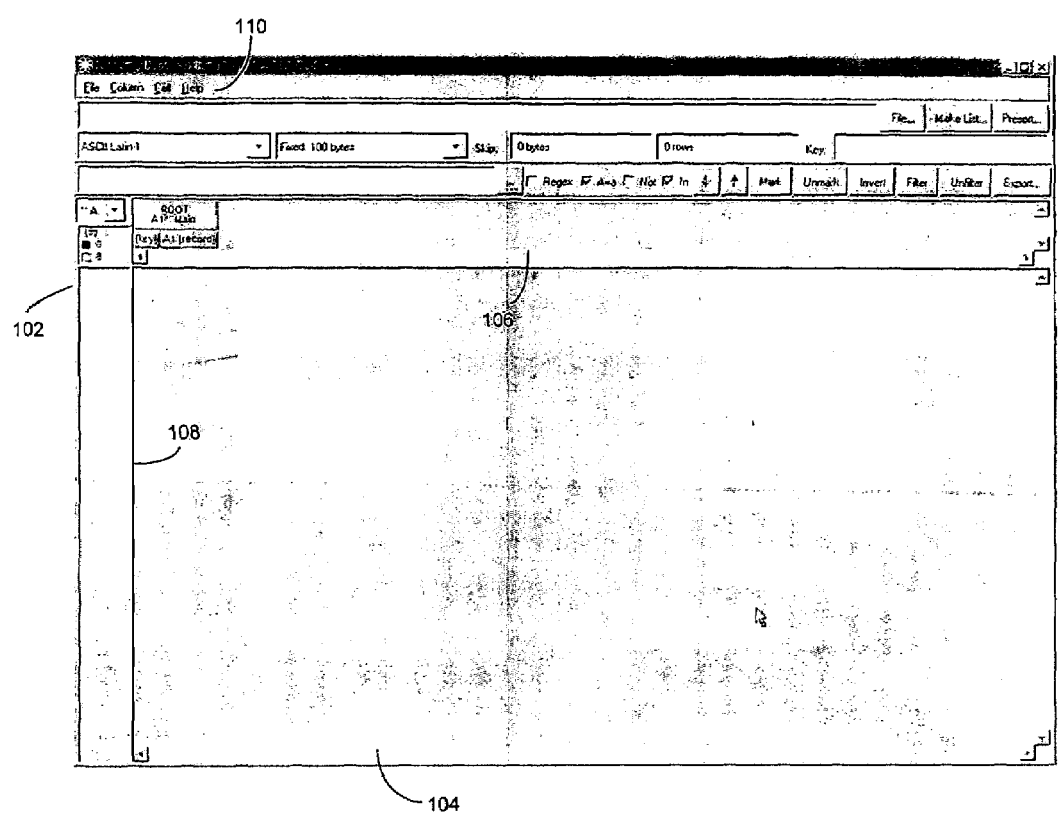

| Count | Value | Run-start |
|---|---|---|
| 3 | l | 126 |
| 2 | o | 189 |
| 1 | , | 0 |
| 1 | . | 21 |
| 1 | H | 42 |
| 1 | d | 63 |
| 1 | e | 84 |
| 1 | r | 105 |
| 1 | w | 231 |
|  |  | 252 |

Step 4 ↑

Values-with-counts 376

| Count | Value | Run-start 378 |
|---|---|---|
| 1 |  | 0 |
| 1 | , | 21 |
| 1 | . | 42 |
| 1 | H | 63 |
| 1 | d | 84 |
| 1 | e | 105 |
| 3 | l | 126 |
| 2 | o | 189 |
| 1 | r | 231 |
| 1 | w | 252 |

Step 3 ↑

Sorted-values

| Rec# | Row# | Value |
|---|---|---|
| 7 | 7 |  |
| 6 | 6 | , |
| 13 | 13 | . |
| 1 | 1 | H |
| 12 | 12 | d |
| 2 | 2 | e |
| 3 | 3 | l |
| 4 | 4 | l |
| 11 | 11 | l |
| 5 | 5 | o |
| 9 | 9 | o |
| 10 | 10 | r |
| 8 | 8 | w |

Figure 19

| Marked source keys |
|---|
| Key |
| 5848802793 |
| 6048804183 |
| 7918070733 |
| 7908013733 |
| 8868809763 |
| ...etc.... |

| Sorted marked source keys |
|---|
| Key |
| 0010002492 |
| 0010015330 |
| 0010020143 |
| 0010029611 |
| 0010039851 |
| ...etc.... |

Figure 26

| Target pairs | |
|---|---|
| Key | Record# |
| 8971199607 | #1 |
| 2844441332 | #2 |
| 6694415051 | #3 |
| 6123358330 | #4 |
| 1470052401 | #5 |
| 3674480475 | #6 |
| 1028875716 | #7 |
| ...etc... | |

| Sorted target pairs | |
|---|---|
| Key | Record# |
| 0010002492 | #11,095 |
| 0010015330 | #18,764 |
| 0010020143 | #23,493 |
| 0010029611 | #35,814 |
| 0010039851 | #59,834 |
| 0010040651 | #18,766 |
| 0010044330 | #10,268 |
| ...etc... | |

Figure 27

PROCESSING DATA RECORDS

BACKGROUND

This description relates to processing of data records.

In a typical database, for example, each record contains values for each attribute or field in a set of fields. For example, an address list database could have name, street number, street name, city, state, and zip code fields (or attributes). Each record would hold the name and address of one person and could (but need not) include values for all of the fields. One record could be for John Jones and include a street number (37) and street name (Portland Street) but no values for other fields.

There are many other contexts in which data may be organized in records that share common attributes and hold values for some or all of those attributes. For example, messages sent on communication channels may each include a header, an addressee, a body, and other fields of data. Each message may be thought of as a record. Streams of such messages and other streams of records need not be organized as formal databases or even as unified files. Yet, they contain what are in effect records that share common attributes and that each include values for some of the attributes.

Typically, the records of a database or other data organized in groups are created, managed, used, displayed, altered, and removed using software for which the format and organization of the records are native. For example, a Microsoft Access database has a file format that is native to Microsoft Access and includes both the raw data (the values of the attributes) and information (metadata) about the formatting and other aspects of the data.

The raw data comprising a set of records may be represented as a stream of characters, one record after another, with values of the fields included in the stream. Typically there is some way to delineate the end of one record and the start of the next record. All of the records may have the same length, for example, or a character such as a comma or a pipe may be inserted into the stream between each pair of records. Within each record the values of the fields may also be distinguished from one another based on length or a separation character or in some other way.

The data in the records may be part of a formal file that also includes metadata about the records. The formal file can be opened and manipulated by the software for which it is native. In some cases, software programs can also import files and data having formats that are not native to the program, convert them to a file of native format, and manipulate, search, and display the records. Some programs can also export files of data records in non-native formats.

Typical common functions of database software are sorting, filtering, and searching for records. Databases may contain millions and even billions of records. Searching is typically done either by hard-coding search strategies or using a query language such as SQL. Sorting and filtering use algorithms to process sometimes large numbers of records.

The user interfaces of ordinary database software enable users to view the records, fields, and values of the database and the results of sorting, filtering, and searching in pre-defined ways.

SUMMARY

In general, in one aspect, a user is enabled to identify arbitrary data records of interest that belong to a file of data records that are expressed in an arbitrary format, and using pre-generated information about the records of the file to enable a user to view a portion of the arbitrary data records that a machine is capable of displaying at one time, the amount of time required to enable the user to view the portion after the data records of interest have been identified being essentially independent of the number of records in the file, the file and the pre-generated information about the records of the file each being too large to be stored, as a whole, in a memory that is used by the machine in accessing the arbitrary data records in response to the user's identification of records of interest.

Implementations may include one or more of the following features. The user is enabled to cause records of interest to be marked, to filter marked records, to cause filtered records to be unmarked, to cause filtered records to be marked, and to perform sequences and iterations of two or more of the following actions: causing records to be marked, filtering records, unmarking records, causing filtered records to be marked. The user is enabled to cause marking of marked or unmarked records to be inverted. The user is enabled to initiate analytical steps on records of the file, including generating a frequency distribution of records and generating a meta-frequency distribution of entries in the frequency distribution. The user is enabled to scroll from one set of displayed records to other displayed records, to sort records of the file, and to scroll to records not currently displayed.

The pre-generated information comprises an index file. The records of the file are delimited, e.g., by length, one or more XML tags, or other delimiters. The delimiters are nested to any arbitrary degree.

The portion of the arbitrary data records that the machine is capable of displaying at one time is limited by a width of a display window, and the action of receiving the indication from the user includes receiving an indication from the user to scroll displayed information horizontally. The number of records in the file exceeds one million. The number of records in the file exceeds one billion. The time required to enable the user to view the portion after the indication has been received is less than one second. The pre-generated information is persistent. The pre-generated information associates a number of each record with a starting location of the record in the file.

In general, in one aspect, a user is enabled to mark records of interest that belong to a file that is too large to be stored, as a whole, in a memory that is used by the machine in accessing the data records in response to the marking, the records that are caused to be marked having arbitrary locations in the file.

Implementations may include one or more of the following features. The user is enabled to view a portion of the marked records of interest that a machine is capable of displaying at one time, the amount of time required to enable the user to view the portion after the user has marked the records being essentially independent of the number of records in the file. The user is enabled to cause records to be marked by specifying filter criteria, and the time required to mark the records after the filter criteria are specified is essentially independent of the number of records in the file. The user is enabled to take an action with respect to the marked records.

In general, in one aspect, a user is enabled to cause records of interest (e.g., records that belong to a file that is too large to be stored, as a whole, in a memory that is used by the machine in accessing the data records in response to the user). The user is enabled to apply a filter to cause only marked records to be subjected to a subsequent action. The user is also enabled to cause a subset of the filtered records to be marked.

Implementations may include one or more of the following features. The records of interest have arbitrary locations in the file. The amount of time required to apply the filter is essentially independent of the number of records in the file. The number of marked records is too large to be stored, as a whole, in the memory. The number of records exceeds one million. The number of records exceeds one billion.

In general, in one aspect, a file of data records that are expressed in an arbitrary format is processed to produce pre-generated information about the records of the file. The file is too large to be stored, as a whole, in a memory that is used by a machine to operate on the records in response to a user's interactions with the machine. The pre-generated information enables the machine to operate on the records in response to the user's interactions in an amount of time that is essentially independent of the number of records in the file. An enhanced file is formed that includes the data records and the pre-generated information and can be used later to permit the machine to operate on the records in response to the user's interactions without requiring a recreation of the pre-generated information.

Implementations may include one or more of the following features. The data records appear in the enhanced file as groups of data containing representations of the data records. The pre-generated information appears in the enhanced file as groups of pre-generated information. The pre-generated information is interleaved with the data records. The pre-generated information includes metadata. The pre-generated information includes frequency data.

In general, in one aspect, in response to a request by a user, data records in a file are analyzed, the data records having values for one or more fields, to determine the number of occurrences of each value of at least one of the fields. A user is enabled to view the number of occurrences of each value of the field and the locations of all records containing that value in the file. There are as many as a billion distinct values of the field.

Implementations may include one or more of the following features. The number of distinct values of the field is as large as 2**64. The user is enabled to view the number of occurrences and the locations of the records in a scrollable window of a user interface.

In general, in one aspect, in response to a request by a user, data records in a file are analyzed, the data records having values for one or more fields, to determine the number of occurrences of each value of at least one of the fields. A user is enabled to view the number of occurrences of each value of the field and the locations of all records containing that value in the file, and the user is enabled to cause records to be marked based on the information viewed by the user.

Implementations may include one or more of the following features. The user is enabled to cause records to be marked based on at least one value or the number of occurrences of one or more values. The user is enabled to cause records to be marked that contain a particular value. The user is enabled to cause records to be marked that contain all values that have the same number of appearances in the records. The user is enabled to control additional marking and filtering of records.

In general, in one aspect, a user is enabled to identify, as a key, a field in each of at least two different files expressed in potentially two different arbitrary file formats and to cause records of interest to be marked in at least one of the files. In at least a second of the files records are automatically marked for which a value of the key corresponds to a value of the key of a marked record of the one file.

Implementations of the invention may include one or more of the following features. The fields that are identified as keys of the two files are different in their structure or location in their respective files. Each of the keys comprises a composite key comprised of possible non-consecutive fields of the file. One of the composite keys comprises a partial composite key relative to the other of the composite keys. The user is enabled to perform sequences and iterations of two or more of the following actions: causing records to be marked, causing records to be filtered, causing records to be unmarked, causing filtered records to be marked. In at least a third file, records are automatically marked for which a value of the key corresponds to a value of the key of the second file. Prior to the automatic marking of records in the third file, a different field of the second file is identified as a key, and a field in the third file that corresponds to the different field of the second file is identified as a key. At least one of the files is too large to be stored, as a whole, in a memory that is used by the machine in accessing the data records in response to the user.

Other aspects of the invention may include methods, apparatus, systems, program products, databases, and file formats that comprise combinations and sub-combinations of features and implementations described above and other features.

Other features and advantages of the invention will be apparent from the description, and from the claims.

DESCRIPTION

FIGS. 1 through 11, and 23 through 25 are screen shots.
FIGS. 12 through 22 are diagrams of record information.
FIGS. 26 and 27 show file structures.

By pre-generating index information about the records of any kind of file that contains records, it is possible to enable a user to (among other things) navigate, view, scroll, mark, filter, and manipulate the file and records of the file extremely rapidly even though the file has an arbitrary file format and is very large (millions or billions of records or more) and even though the file (and even the index information) cannot all be stored in memory at once.

We describe two example applications that provide such capabilities. One is in the form of viewer, the other in the form of a migrator. By embedding the pre-generated index information with the records in an enhanced file, the viewer may provide these capabilities to the user immediately upon his loading the file, without requiring any preprocessing. The enhanced file can be transferred easily among users. The migrator, in addition to providing the capabilities to the user, also enables the user to take any arbitrary set of records and have the index information pre-generated and bundled with the records in an enhanced file, which can then be viewed on any other instance of the migrator or the viewer.

The user interfaces for the viewer and the migrating tool are similar. As shown in FIG. 1, the user interface 102 for the migrating tool (sometimes called simply the tool) includes a data pane 104 that is scrollable in both dimensions, a field pane 106 that is also scrollable in two dimensions, a marking pane 108, and a menu bar 110.

A stream of data organized as records can be loaded into the tool whether or not it is in a native format used by the tool. The viewer can only open a file of data records that is in the native format used by the viewer.

To open a file that is in the native format, the user selects "open" from the "file" menu, navigates the file system to find a desired file, and opens it.

Figure 2:
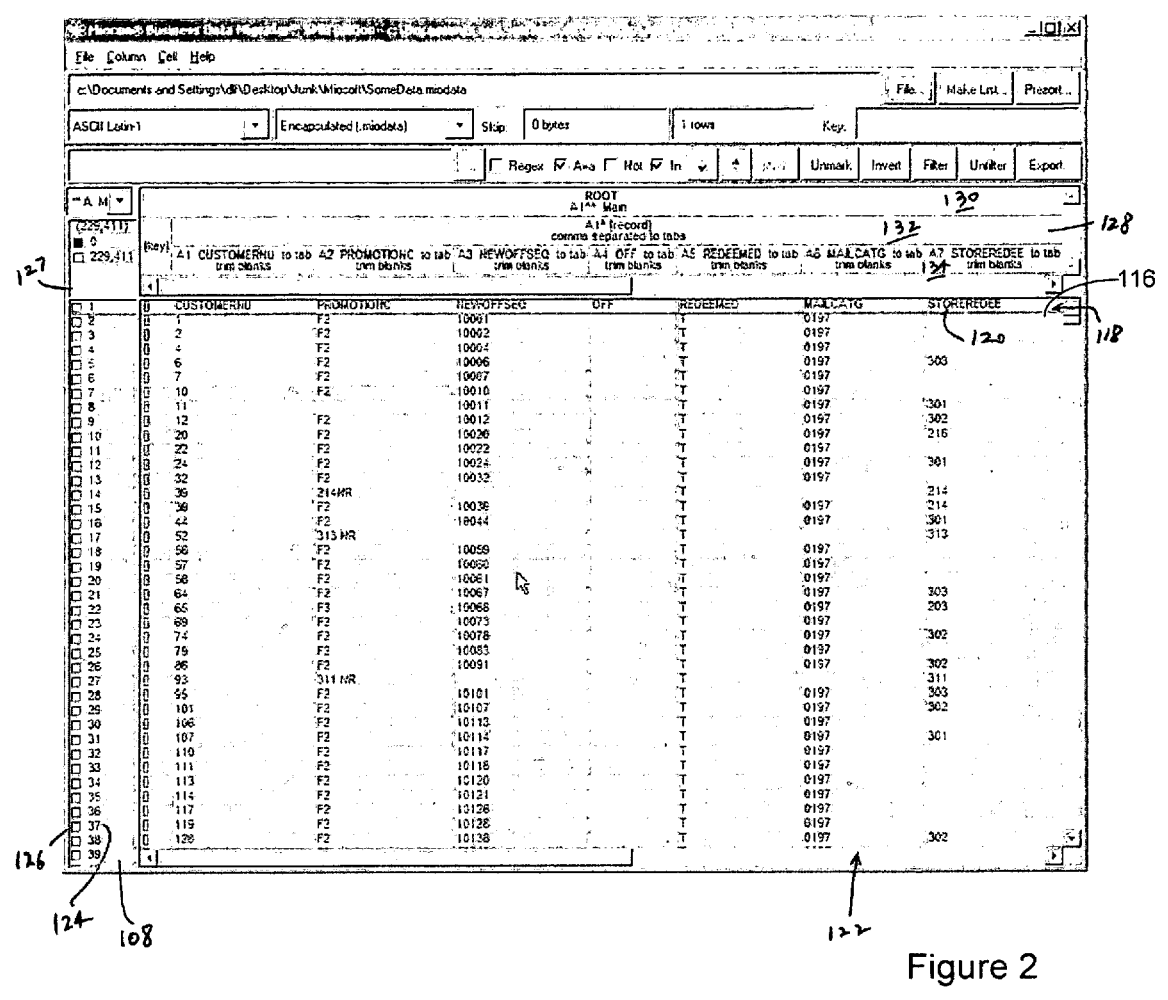

As shown in FIG. 2, when the file is opened, the program populates the data pane with a portion of the records of the file, one line 116 per record. The first line of the data pane 118 displays the names 120 of the fields represented by the columns 122 of the display. Although, in this example, the names occur in the first record of the file, that need not be so. In the marking pane 108, an index number 124 associated with each of the records is displayed next to a check box 126 that indicates whether that record has been marked or not. A small tally pane 127 above the marking pane shows the total number of records in the file and the numbers that have been marked (black box, in this case none) and not marked. Records can be marked and unmarked individually by hand using the cursor and marked and unmarked automatically in other ways.

The field pane 106 contains information that represents a hierarchical tree that defines relationships among fields of the records of the file. The levels of the hierarchy are represented by rows 128 of information displayed in the field pane. The top row 130 is the root of the tree and represents the "key level" of the file. The second row 132 in the example represents all of the records of the file. The third row 134 in the example represents individual fields of the records of the file. Information about each of the levels of the hierarchy is set forth next to the title of the item of the hierarchy, as shown.

Not all of the fields of the data are shown in FIG. 2. The hidden fields can be exposed using the horizontal scroll bar under the field pane or the horizontal scroll bar under the data pane.

By right clicking on any of the field identifiers in the field pane, a context sensitive menu 140 opens to list actions that can be performed, for example, with respect to that field. The same menu is also available by invoking the "column" entry in the menu bar.

Figure 3:
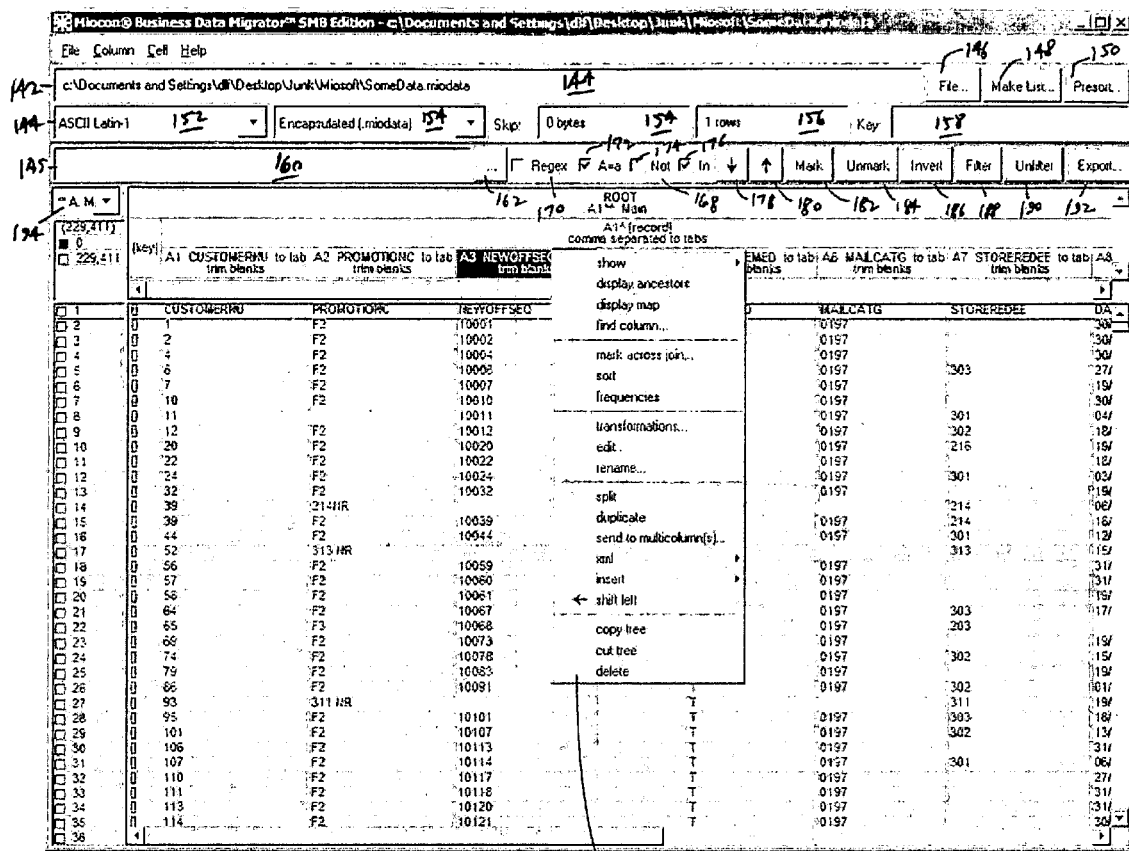
Figure 4:
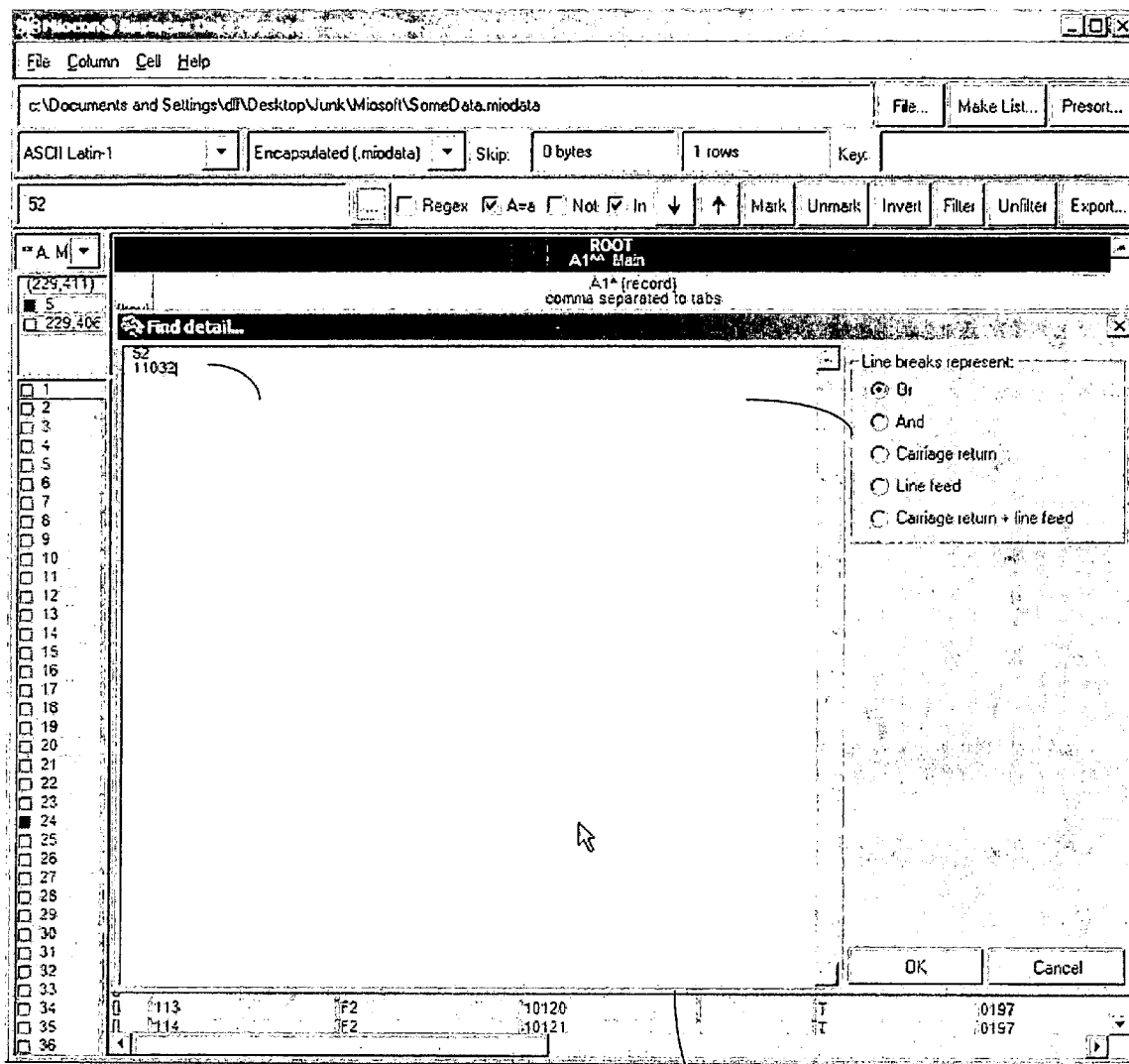

Only about 35 of the records (of a file of 229,411 records) are shown on FIG. 3. The user can scroll almost instantaneously to display any other group of records anywhere in the file using the vertical scroll bar on the right side of the data pane. Other features allow records to be selected, filtered, or sorted. In each case, a portion of the records that result from the operation appear very quickly on the screen.

Additional information and functions are made available to the user through three rows of controls 142, 144, 145 near the top of the user interface of the tool. For the viewer application, only the third row is displayed.

In the tool, row 142 includes a text box 144 containing the path in the file system to the file whose data is currently displayed. The file can be selected either using the "file" "open" function with respect to files that are in the native format (this is the only way files are opened in the viewer), or the "file" button 146 to the right of the text box with respect to any kind of file that contains records in any format, native or not.

Also in row 142 are a "make list" button 148 and a "presort" button 150.

In row 144, a drop down list box 152 enables a user to specify a character set that is being used in the data. Another drop down list box 154 enables the user to specify the way in which the records of the file are delimited, for example, fixed length, size prefixed, delimited, XML, or native format (in the example shown in FIG. 3, the native format—encapsulated (miodata)—is indicated).

The next box 154 enables the user to indicate a number of bytes to skip at the beginning of the file and the next box 156 that a number of the records at the beginning of the file should not be treated as data records, for example, because they are field headers (in the example shown, one header row is skipped, hence the dark line under the first row). The final box 158 in row 144 contains the key of the data records.

Row 145 (which is also present in the viewer's user interface) is a row in which the user can control a search of the records. A first box 160 enables the user to enter either a single row search criterion (for example, a number or a date). By invoking a button 162, the user is presented with a dialog box 166 (FIG. 4) that allows more complicated search criteria to be entered.

Returning to FIG. 4, the dialog box includes a pane in which the search criteria may be entered, one criterion per line and a set of radio buttons 168 that define how the line breaks in the pane are to be interpreted. Continuing along the search specification row 145, a Regex button 170 indicates that the search criterion should be treated as a regular expression, an A=a button 172 indicates that the search should be case-insensitive, a Not button 174 indicates that the search should find records that do NOT match the criteria, an In button 176 indicates that the search should find occurrences of the criteria anywhere within the data (for example, embedded, as opposed to constituting an entire field value).

Up and Down buttons 180, 178 execute a search through the records (up or down, respectively). Mark button 182 marks all visible records matching the search criteria. Unmark 184 removes all marks. An Invert button 186 marks all visible records not already marked and unmarks all the rest that were previously marked. Filter and Unfilter buttons 188, 190 remove (make invisible) and restore (make visible) to the display all of the records not marked. Unfilter also restores the original order of the records if a sort has been performed by the user. An Export button 192, which is not present in the user interface for the viewer, causes a dialog box to open in which a user can control the export of the file in a native format for use in viewers and tools. Non-native formats are also supported, such as delimiting records by line breaks.

Figure 6:
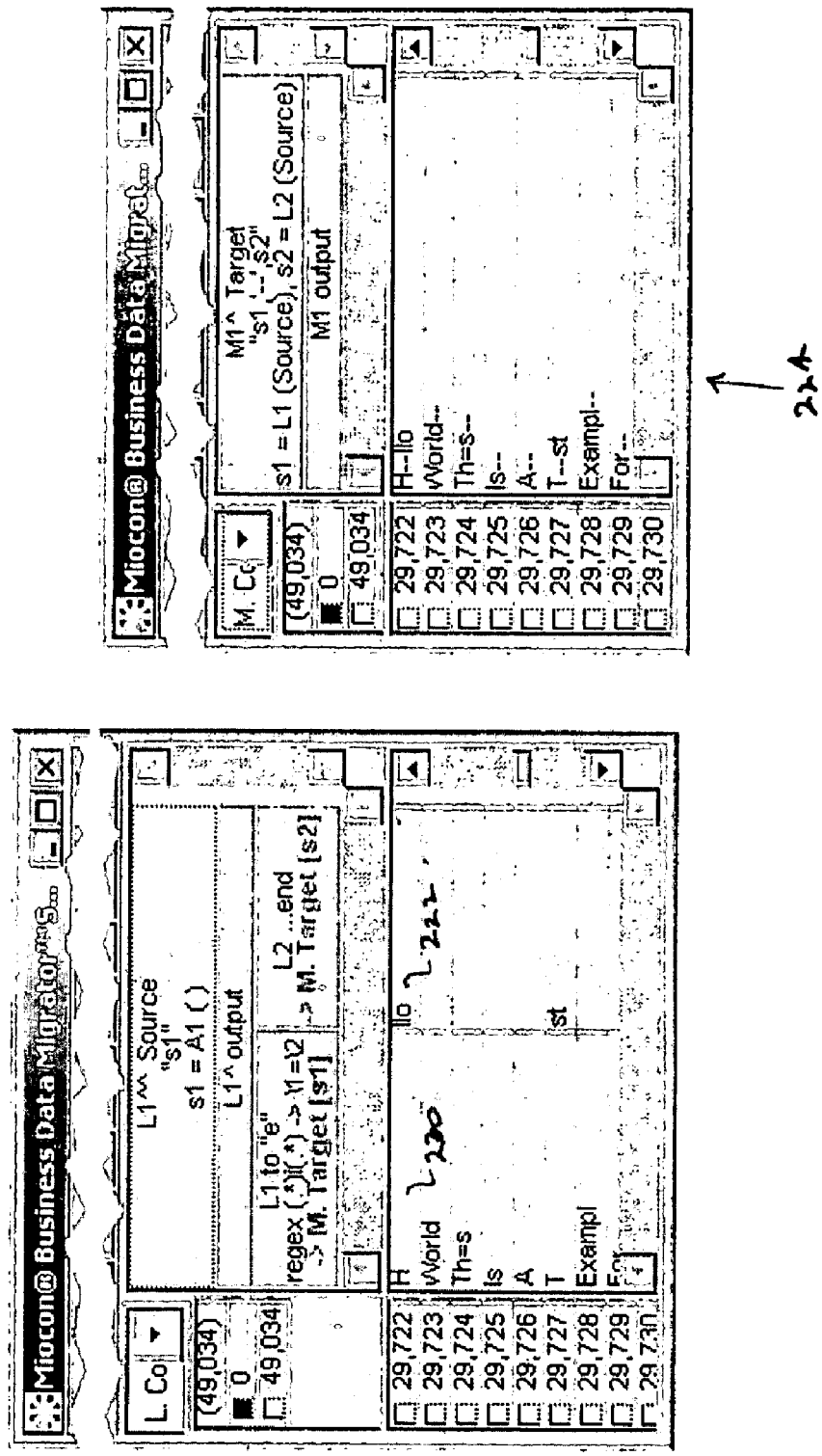

A small drop down box 194 just above the tally pane is a multi-column edit (MCE) as illustrated in FIG. 6.

A feature of the tool and the viewer is the enabling of very fast scrolling even through arbitrary very large delimited files. Arbitrary files include files that, for example, are not in a predefined format (such as a proprietary database file or word processing file). Very large files include those, for example, for which the file (and even information about each record in the file) is too large to be kept entirely in memory at one time. Very large files may include millions or even billions of records or more. Delimited files, for example, include those for which the size of the records is not fixed.

The ability to scroll very rapidly through such a file may be achieved by automatically creating a persistent index associating a number for each record with a starting location of the record and using the persistent index to facilitate the scrolling.

Figure 5:
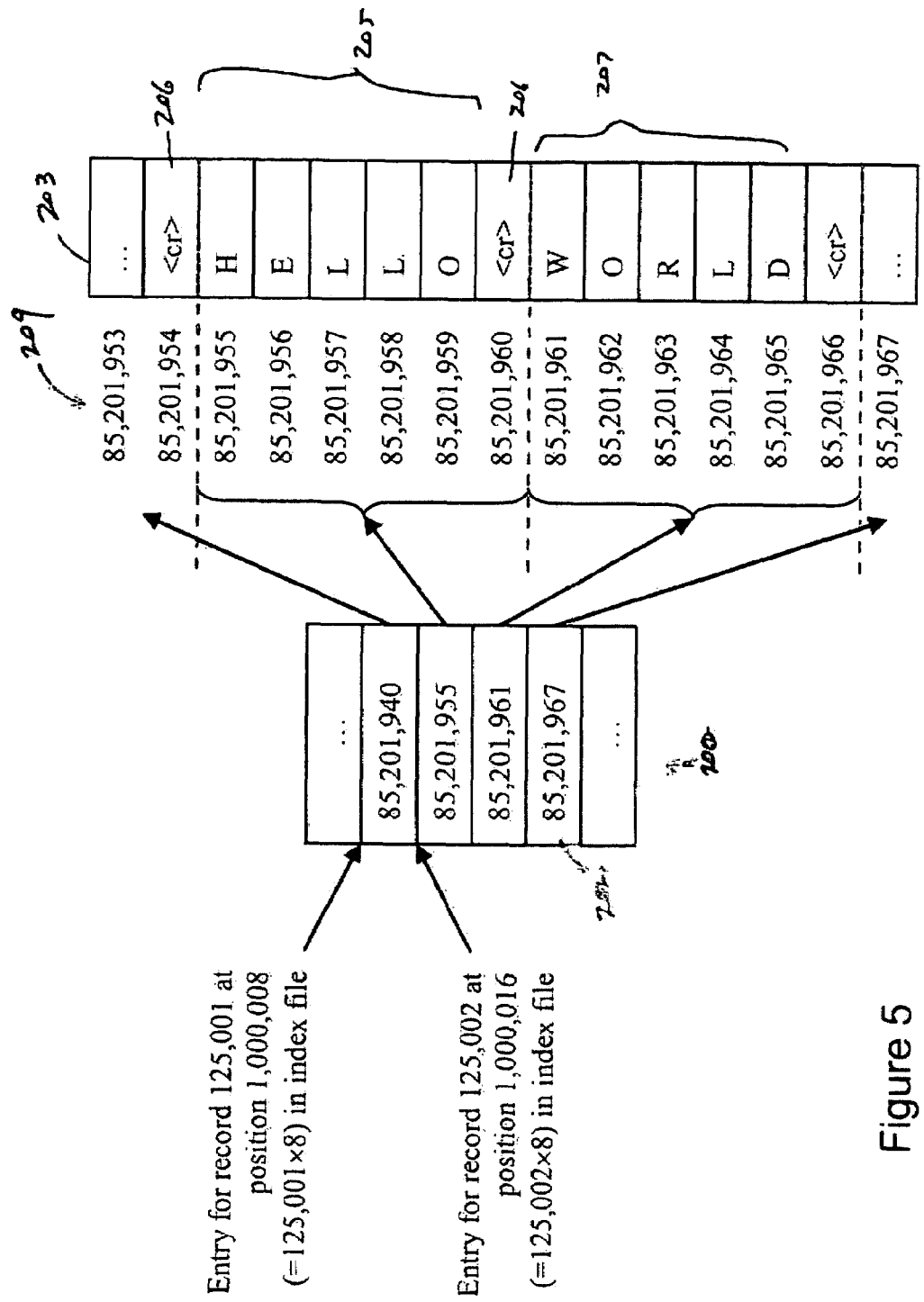

When the user asks to view a delimited file (either in the viewer or in the tool), the file is scanned for the specified record delimiter character. At the same time another file is created, which we will call the index file. An example of a portion of the structure of an index file 200 is shown in FIG. 5. The index file consists of a series of 8-byte integers 202. The delimited file is an ordered series of characters 203. The successive characters may be thought of as having successive positions 209 in the file. Groups 205, 207 of successive characters represent records of the file. Successive records of the file are separated by the delimiter character 206 (in this example, a carriage return).

At the start of scanning of the delimited file 204, a zero (not shown) is written to the index file to indicate that the first record of the delimited file occurs at position 0. As each successive delimiter character 206 (in this example, a carriage return) is encountered in the delimited file, the file position immediately after the delimiter (which is the start of a record) is recorded as an 8-byte integer 202 in the index file. When the end of the delimited file is reached, the index file will consist of a series of 8-byte integers, representing a sequence of positions in the delimited file at which the successive records begin. The index file has a series of positions each position corresponding to one of the records of the delimited file, each of the positions being the start of one of the 8-byte integers in the index file.

At this point, one can determine the number of records in the file by dividing the index file's size by 8 (the number of bytes in the index file for each record in the delimited file). In addition, given a record number, that is, the number of the record in the sequence of records in the delimited file (say 125,001), one can multiply it by 8 (to get 1,000,008), seek to that position in the index file, read the 8-byte integer stored there (in the example, 85,201,940), then seek to that integer offset in the delimited file. The record can then be read immediately by scanning the bytes from that position in the delimited file up to the next delimiter. Alternatively, one can avoid this scan and simply fetch all of the bytes of the record at once, by reading the next 8 bytes (if present, in the example 85,201,955) from the index file. That integer represents the start of the next record, so subtracting one yields the last byte of the current record.

To display a screenful of data (the number of records that can fit on the screen), the application intercepts the "repaint" event from the operating system and handles it directly. The application examines the current scroll position to determine which record should be displayed at the top of the list, and then uses the above technique a number of times needed to extract just those records needed to repaint the window. If a repaint event is asking for only a portion of the window to be repainted, the application avoids fetching records outside of the vertical range that needs to be redrawn.

Thus, the task of fetching records from the delimited file and repainting the screen to show some portion of them is made very quick and simple by the use of the created index file. One only needs to know the number of the record in the delimited file that is to be the first record shown on the screen.

Other techniques can be used for files that are in file formats other than those having records delimited by a character. For example, during scanning of the source file, record boundaries can be determined using regular expressions (The REGEX feature), using nested XML tags, or using bytes at the start of each record indicating the record's length. A file of fixed length records is handled without the need for a separate index file or a pre-pass to determine record positions by simply multiplying the record number times the fixed record size to locate the starting position of a record.

The file indexing mechanism described above does not demand significant storage disk resources. One or occasionally two buffers are adequate to hold the data needed from the index file for repainting a window. A contiguous region of the delimited file must be read from disk when redrawing, but a modern operating system's disk cache easily contains this. For example, displaying 50 records where each is approximately 200 bytes in length consumes 50×200=10,000 bytes of disk cache, which is trivial. Very large records or a very tall window may increase the demands on the disk cache.

Processing and storage resources are also conserved by processing records dynamically prior to their display. A record might be processed by separating it into pieces (subrecords) by scanning it for another delimiter character (e.g., a comma). It might be processed by being divided into pieces of fixed length. The resulting subsections can themselves be further processed. One can also apply transformations such as one that uses regular expression matching to locate and replace specific patterns.

As the user scrolls the window, the records are fetched from disk as needed, but are passed, one at a time, through the processing steps that the user has chosen. The resulting values are displayed in a grid, with one record occupying each row.

The processing steps involved in, for example, separating records into pieces, processing the records or the pieces, applying transformations, and other processing selected by the user or done automatically, need only be applied dynamically to those records that are fetched to be displayed at a given time.

As shown in FIG. 6, a "multi-column" edit facility brings together multiple pieces of data 220, 222, from different parts of each record. That concept is called a "multi-column edit". A multi-column edit is fed data from one or more parts of a record, and applies some processing to it, such as simple concatenation, or execution of a formula to produce a resulting column 224 of data related to the record.

Additionally, only those processing steps that are necessary for displaying columns that are visible are executed. Columns that are scrolled off the left or right sides of the window do not execute their processing steps until and unless they are scrolled back onto the visible region of the window.

As mentioned earlier, the user is given the ability to mark selective records of interest in an arbitrary very large file, including the ability to change what is marked by marking more records and/or unmarking some records at a latter time. The user can then choose to view only the marked subset of records or the unmarked subset of records.

Figure 7:
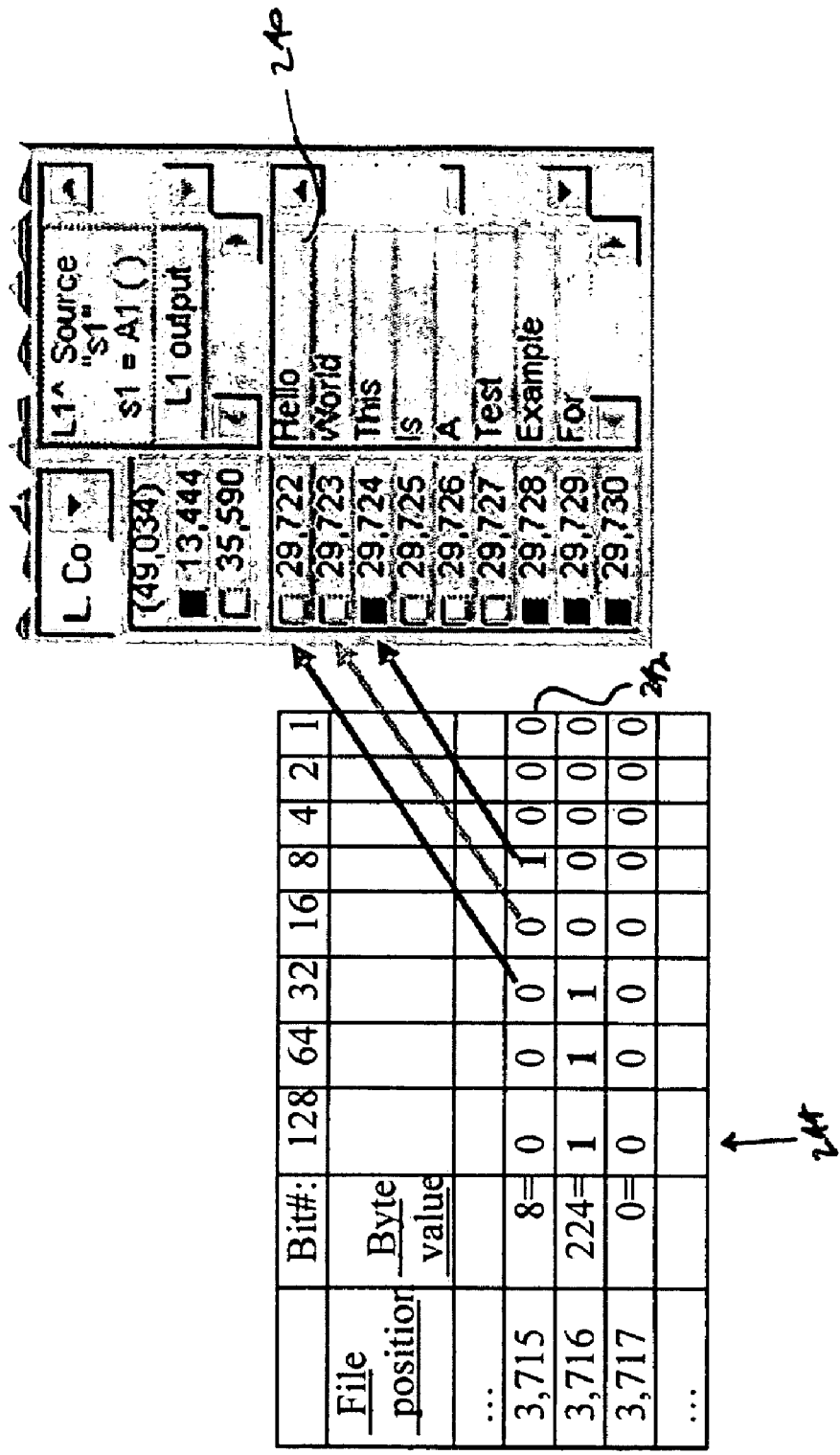

As shown in FIG. 7, a bit vector containing one bit per record is used to track the marking or unmarking of records. In the example shown, each of the records 240 has a corresponding bit (1 or 0 for marked or unmarked) in the bit vector 242. The bit vector is shown expressed as a series (rows) of 8-bit bytes in a series of positions 244. The value of each byte expresses the marked or unmarked status of eight of the records.

For sufficiently large files, the bit vector is backed by a file on disk to avoid consuming inordinate amounts of memory. The threshold is currently set near 20 MB, which corresponds with approximately 160,000,000 records. Files smaller than this use a memory-based bit vector, and files larger than this use a bit vector stored on disk.

For a file of millions or billions of records it is frequently impractical for a user to manually mark each record of interest. To address this, marking can be done automatically based on a pattern. As explained before, controls in the user interface permit the user to enter and control a search pattern. This pattern may be a regular expression, a specific string, or the disjunction of many strings. Additional user interface elements control which of those choices is the correct way to interpret the search pattern, whether the pattern must match an entire cell of the grid or is allowed to occur as a substring, whether to be case sensitive or insensitive, and whether to negate the sense of the matching.

Figure 8:
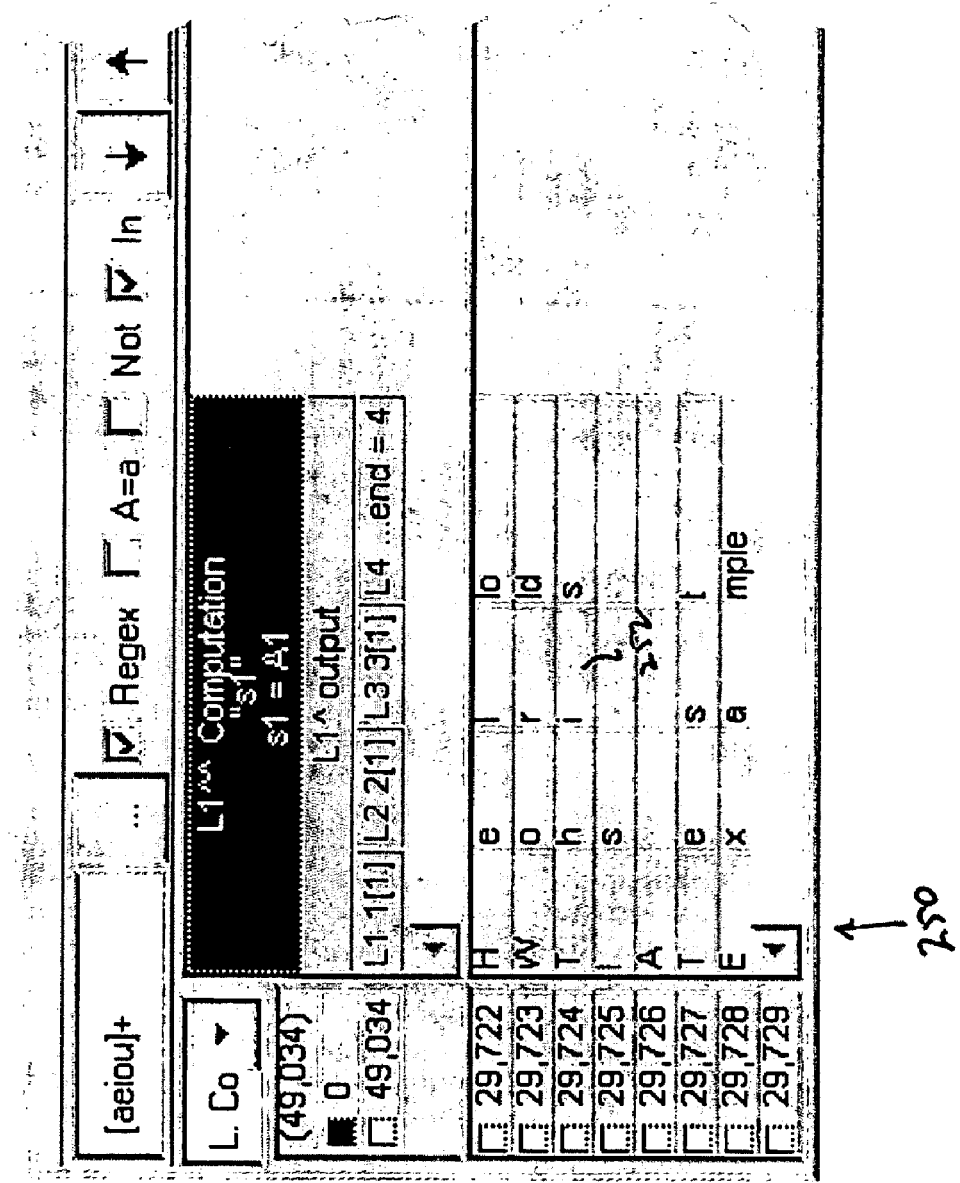

As shown in FIG. 8, in the case of a pattern, once the pattern has been specified, a column (or multiple columns) 250 may be selected. Matching occurrences 252 of the pattern are immediately highlighted in the column. This is accomplished in a similar manner to the mechanism for scrolling through a large file. For those columns that are selected, an additional processing step is performed that tests whether the string that is to be displayed in a cell matches the search pattern. If so, highlighting is applied to it. When a different column is selected, the window is simply redrawn.

Figure 9:
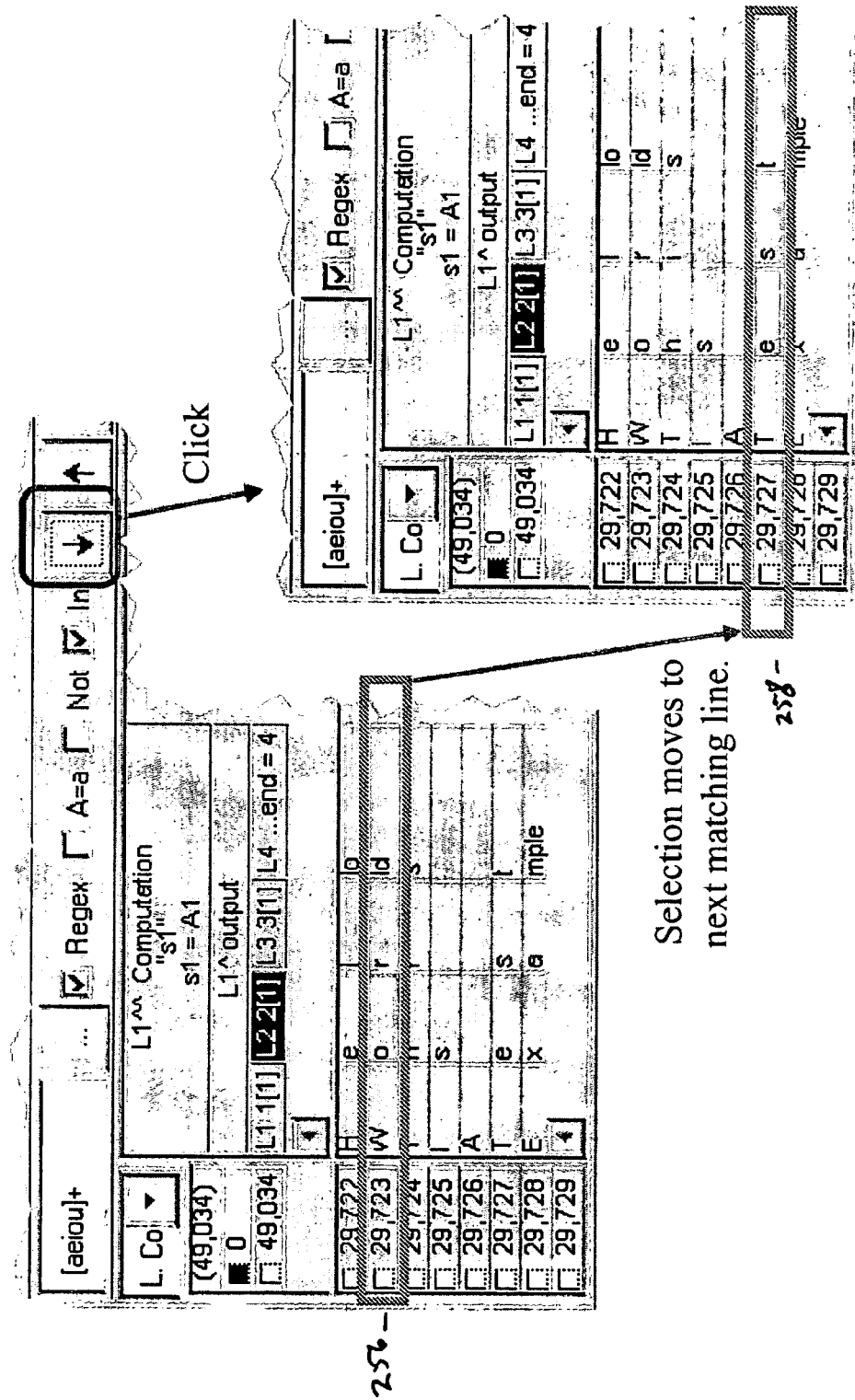

Also available to the user are "next" and "previous" buttons, labeled with a down-arrow and an up-arrow respectively. As shown in FIG. 9, when "next" is pressed, the records are examined starting at the currently selected line 256 (if any, otherwise the first record), progressing downwards (i.e., in increasing record number order). Each record is tested to determine whether the value that would be displayed for that record in the selected column matches the search pattern. If so, the window is scrolled to make that record 258 visible, and that row is selected. If the records are exhausted without a match, the selected row (if any) is deselected and the window flashes to indicate the absence of a match. Pressing "previous" is similar, but the search proceeds in the opposite direction, starting at the end of the file if no row is selected.

Figure 10:
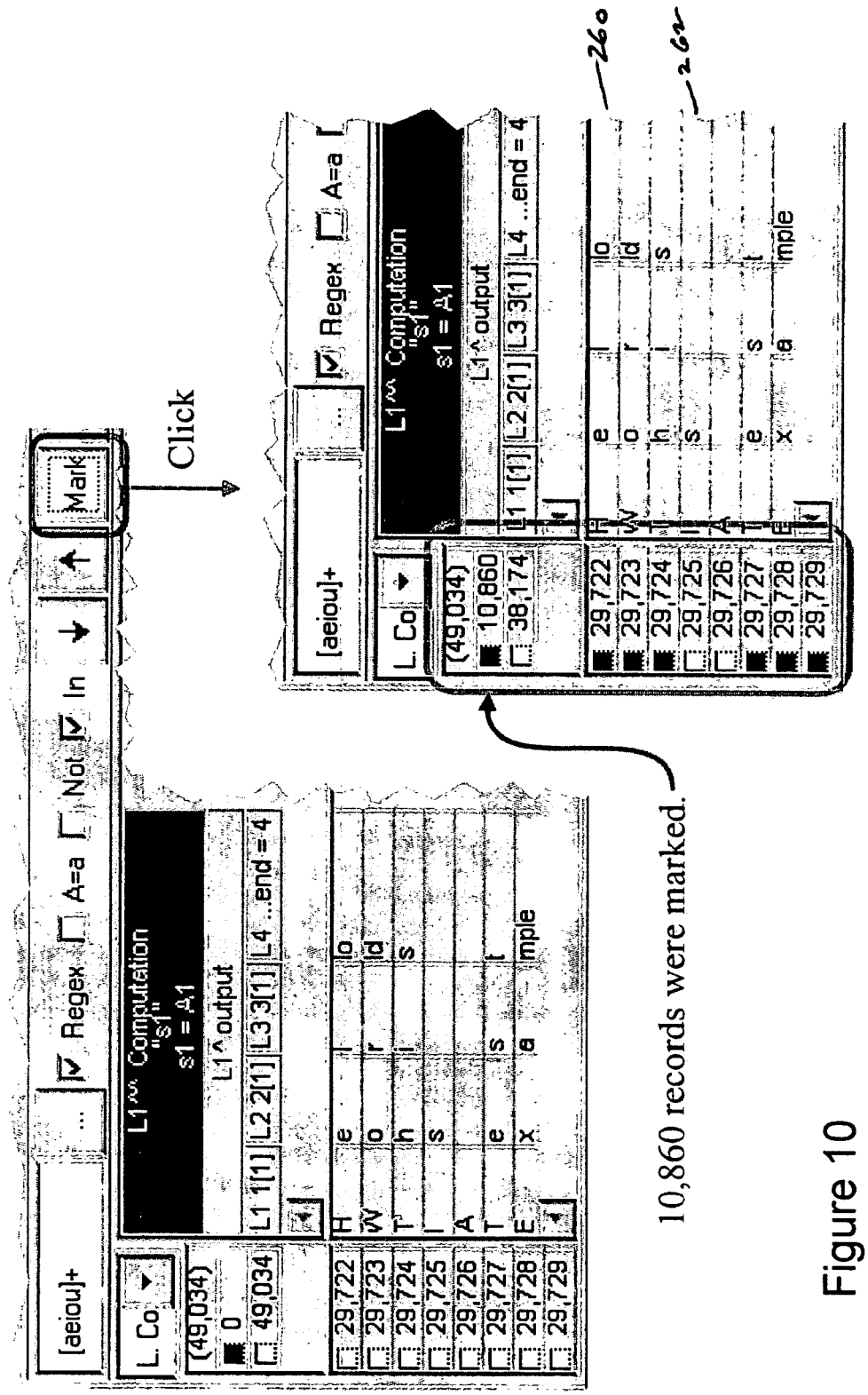

A button labeled "Mark" causes the entire file to be scanned. As shown in FIG. 10, for each record that is found to have a matching value in the selected column, that record 260 is marked. Non-matching records 262 are unaffected, which allows an "or"-like behavior. For example, one could first mark records that match pattern 1 and then match records that match pattern 2. The resulting marked records are those that matched either pattern 1 or pattern 2.

A button labeled "Unmark" causes all records to become unmarked.

A button labeled "Invert" causes all marked records to become unmarked, and all unmarked records to become marked. This capability, when combined with the "or"-like behavior of marking, provides an "and"-like behavior. If one marks everything not matching pattern 1 (by negating the sense of the matching as mentioned above), then marks everything not matching pattern 2, then inverts the markings, one ends up having marked only those records that match both pattern 1 and pattern 2 simultaneously.

The viewer and tool also enable a user to filter the viewed records of an arbitrary very large file to include (in the filtered set) only those that are marked. A subset of the filtered records can then be marked. Besides being able to mark records, a button labeled "Filter" allows a user to hide all unmarked records. "Unfilter" reveals all hidden records. The tally of marked and unmarked records is updated to reflect the results of filtering and marking as applied to the whole file of records.

Records that are hidden are never examined or processed when using "Next", "Previous" and "Mark". In addition, the "Invert" button operates only on the visible set of records. The "Filter" button can be used even when some records are hidden. In this case, the hidden records remain hidden, and all visible unmarked records become hidden.

Figure 11:
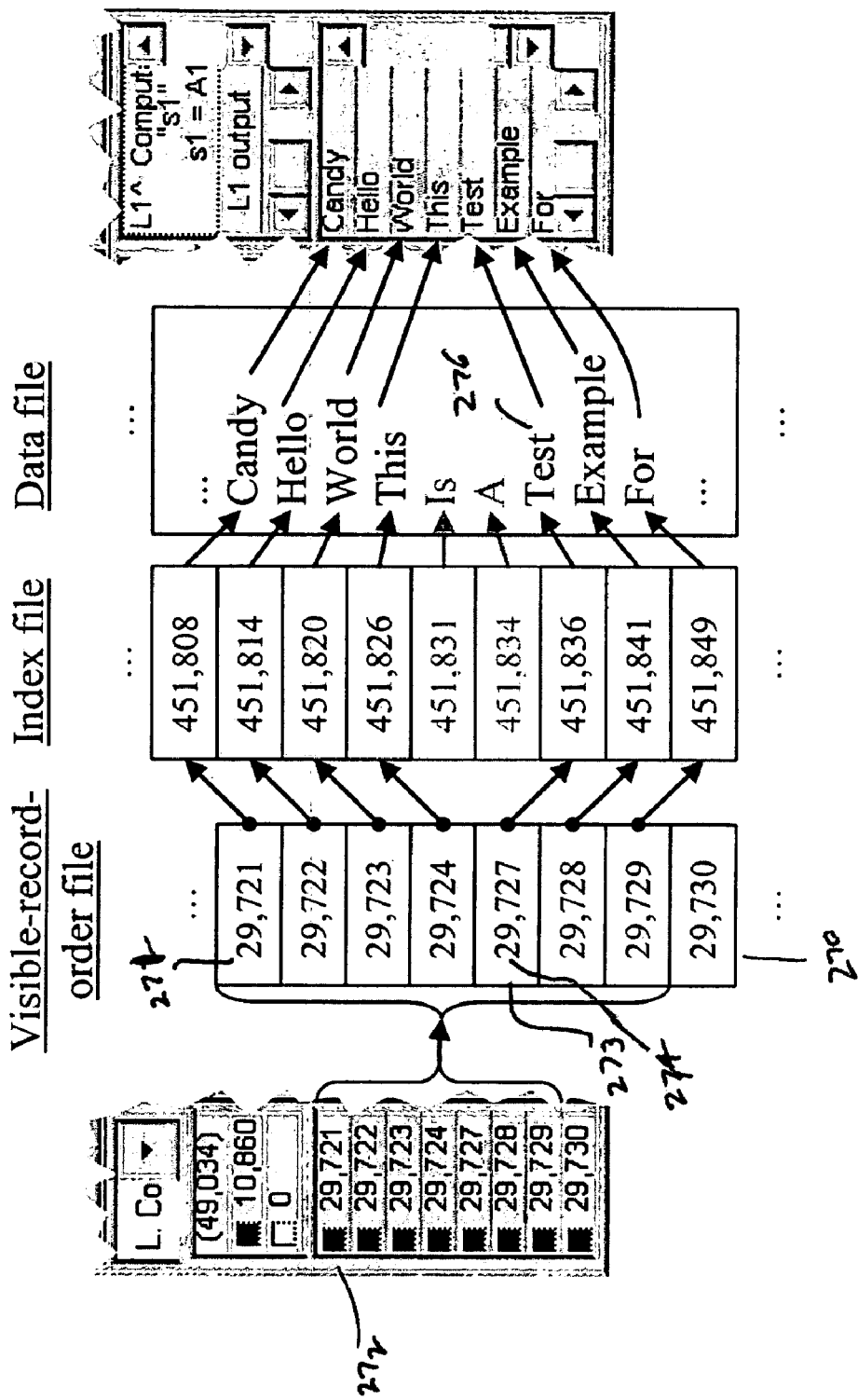

As shown in FIG. 11, in order to support scrolling through a file in which some records have been hidden, another disk file, "visible-record-order", is used to hold a list 270 of the numbers of the visible records 272. The record numbers 271 are 8 bytes each. To determine the $N^{th}$ row 273 to display on the screen, this disk file is positioned to N×8, and an 8 byte record number is read. This record number 274 is looked up in the index file and data file as above to get the actual record data 276, which is then processed as above to produce the data to display in the window. The number of rows visible (useful for determining the scroll bar position and size) is the size of this file 270 divided by 8.

On-screen sorting allows one to select a column and re-order all visible rows so that the values for the column occur in ascending order (no collation policy, just raw Unicode sequences). The order of records is maintained using the "visible-record-order" disk file. For example, if its $J^{th}$ 8-byte entry is the value K, then the $J^{th}$ record from the top of the list is the $K^{th}$ record in the file.

Operations sensitive to visibility (Next, Previous, Mark, Invert, Filter) can scan the visible-record-order file in order, 8 bytes at a time, to produce record numbers. As each record number is read, the corresponding record can be read using the previously described mechanism. Although this doesn't guarantee dense reads, it at least visits the records in increasing record order, assuming an on-screen sort has not been performed.

The index file described above may be saved with (or without) the file of records to preclude the need (and delay) to create the index file when the viewer (or the tool) is first started for subsequent viewing.

In cases for which the index information is to be saved with the file records, a new file format, called the "miodata" file format, is used. A miodata file contains index information, record data, and metadata. There are two examples of different miodata formats, distinguished by a version number at the start of the file.

Figure 12:
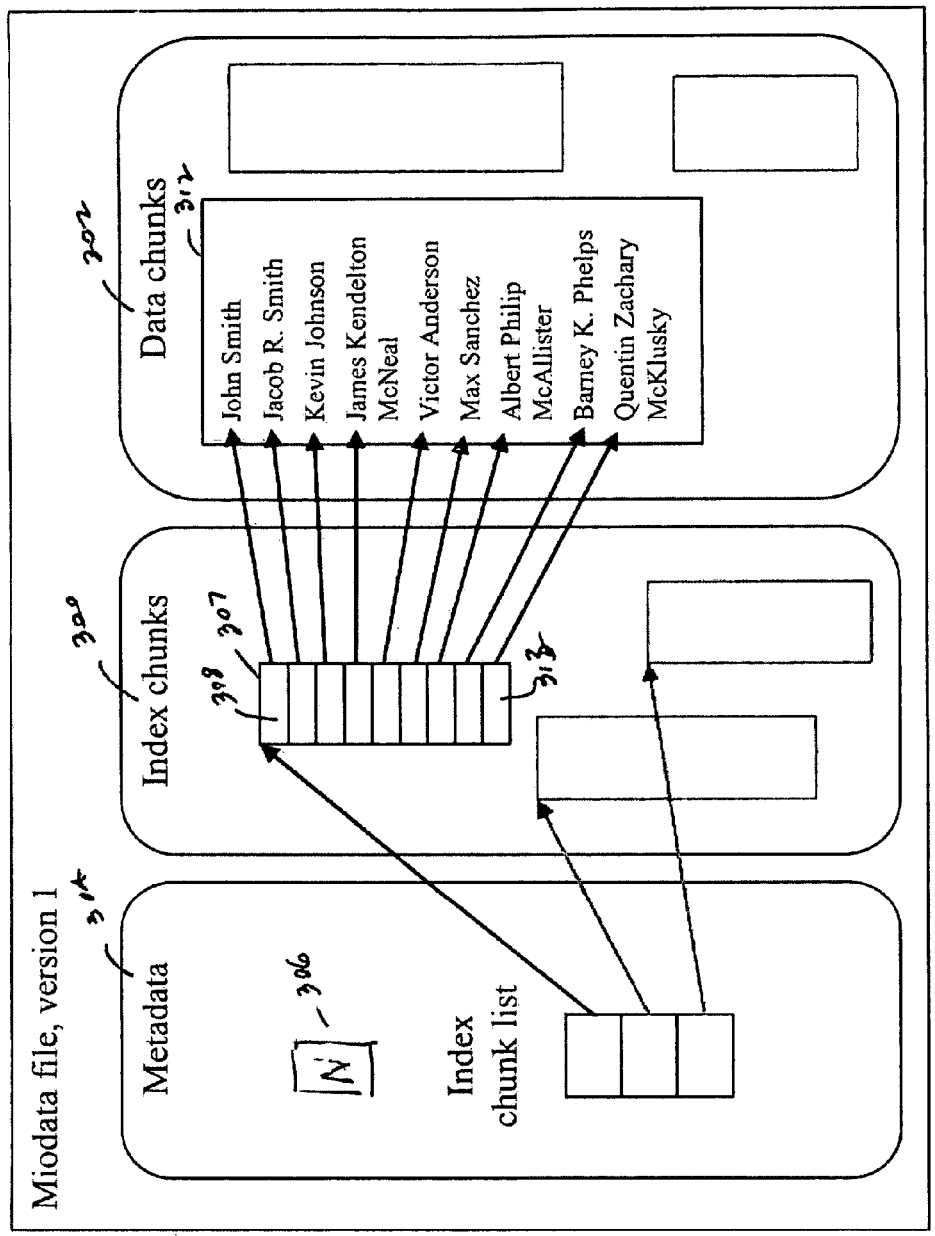
Figure 13:
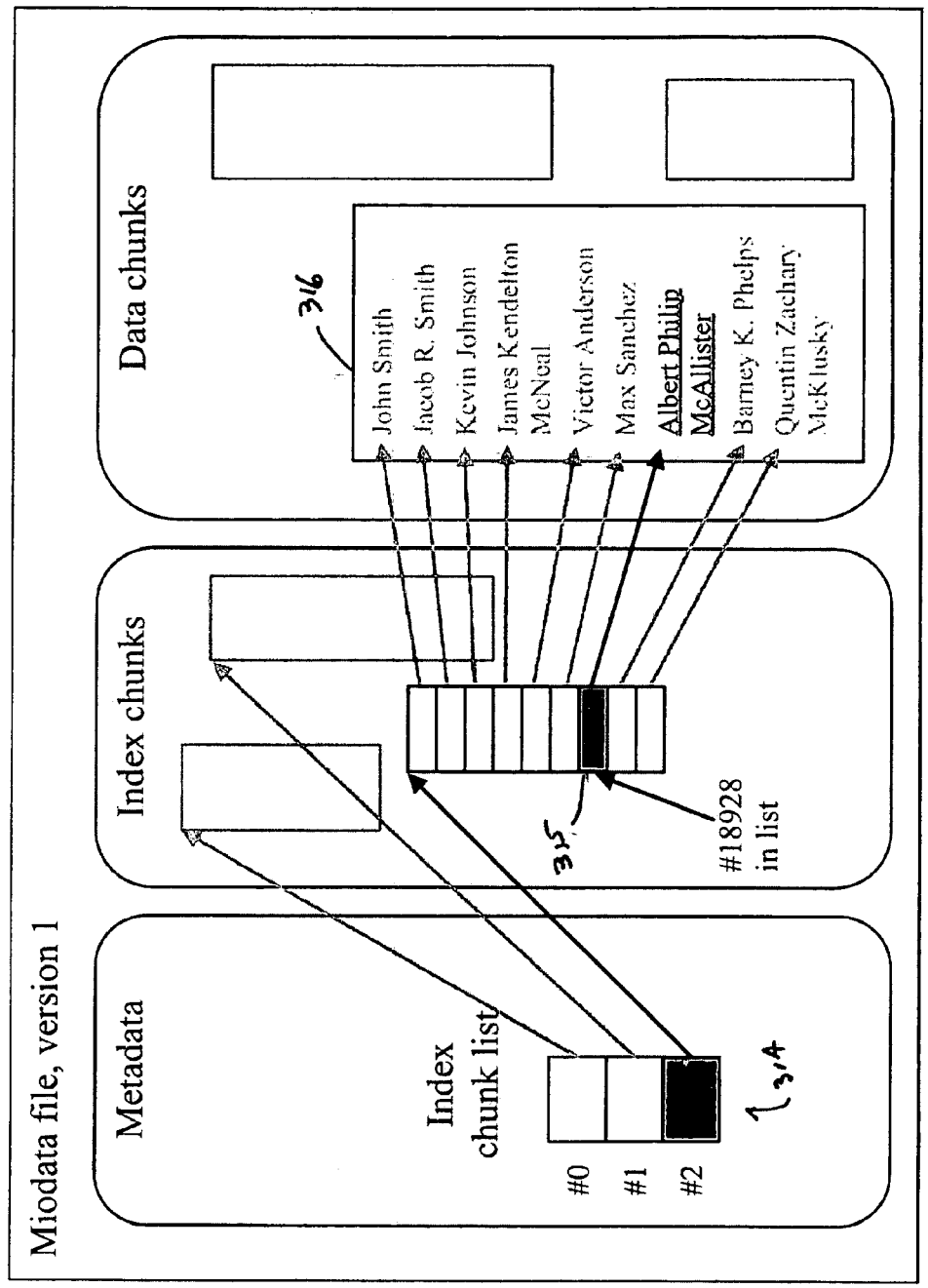

As shown in FIGS. 12 and 13, the first miodata format is the simpler of the two. It consists of an alternating sequence of index chunks 300 and data chunks 302, followed by metadata 304. The index chunks are of equal size and index N records, except the last chunk, which may be shorter. The index chunk size N 306 is stored in the file's metadata area and typically indexes 65,536 records. The program that creates miodata files can produce files for special purposes with much smaller or much larger index chunks. Each index chunk 307 contains a list of N+1 (typically 65,537) absolute 8-byte file position values 308 that identify the starts of records 308 within a corresponding data chunk 312, that is, there is a one-to-one mapping of index chunks and data chunks). The $N+1^{st}$ entry 313 of the index chunk points to just past the end of the $N^{th}$ record of the data chunk, to eliminate a boundary condition and simplify the access protocol.

To retrieve record K, you divide K by N to find which index chunk to look at. You then look at the 16 bytes starting at offset 8×(K mod N) within the index chunk. Those 16 bytes contain two 8-byte integers, the record start position and one past the record end position. The record data can then be retrieved from that region of the file. The record is in the data chunk but since the record position is an absolute file position, that fact is not needed for retrieving the record.

Referring to FIG. 13, for example, to locate the $150,000^{th}$ entry of a data file, compute floor (150,000/65,536)=2 (where floor is the integer result of dividing the entry number by the index chunk size). Thus, we look at the index chunk list 314 of the metadata to find a pointer to index chunk #2 (zero-based). We look at position (150,000 mod 65,536)=18,928 of that index chunk, which occurs 18,928×8=151,424 bytes past the start of the index chunk. The 8 bytes starting at that position 315 represent an absolute position in the file, giving the location of the start of the $150,000^{th}$ entry's data in the corresponding data chunk 316.

The index chunks are kept in a small cache. Otherwise, a series of requests to fetch multiple records would cause the operating system to thrash by alternately transferring the page on which an index chunk occurs, followed by the page on which the corresponding data occurs.

Figure 14:
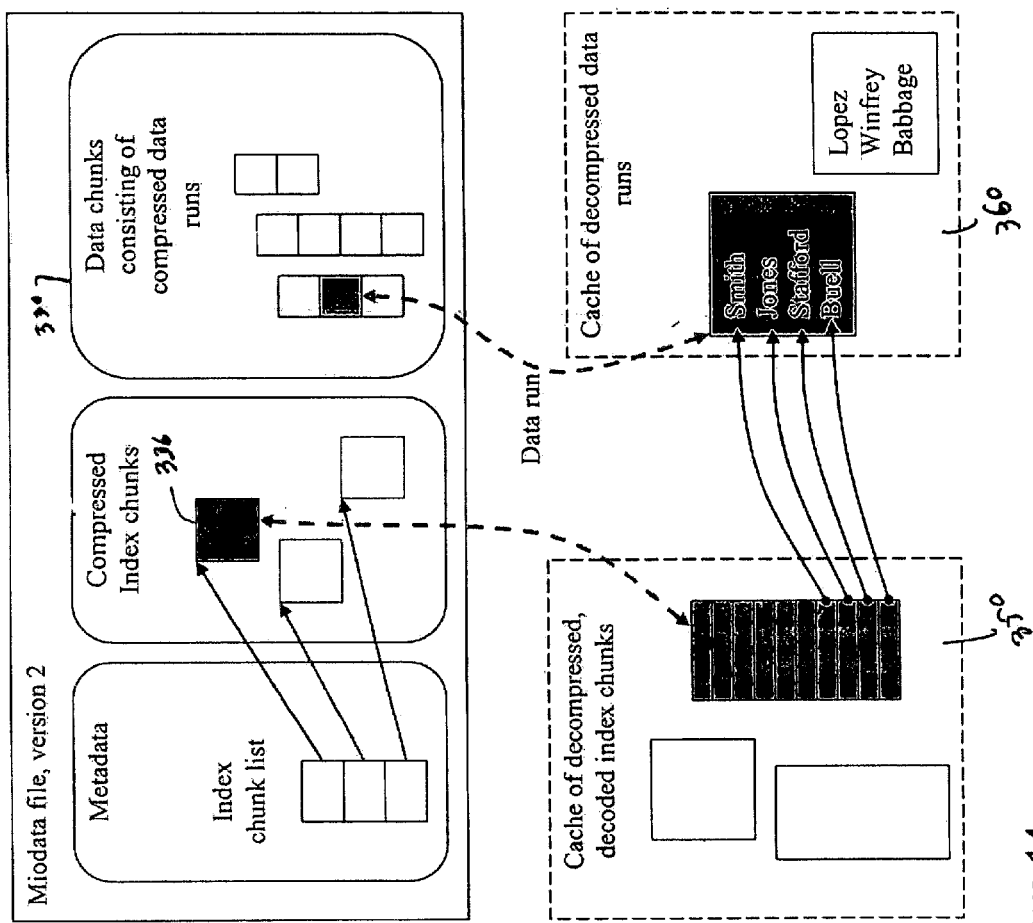
Figure 15:
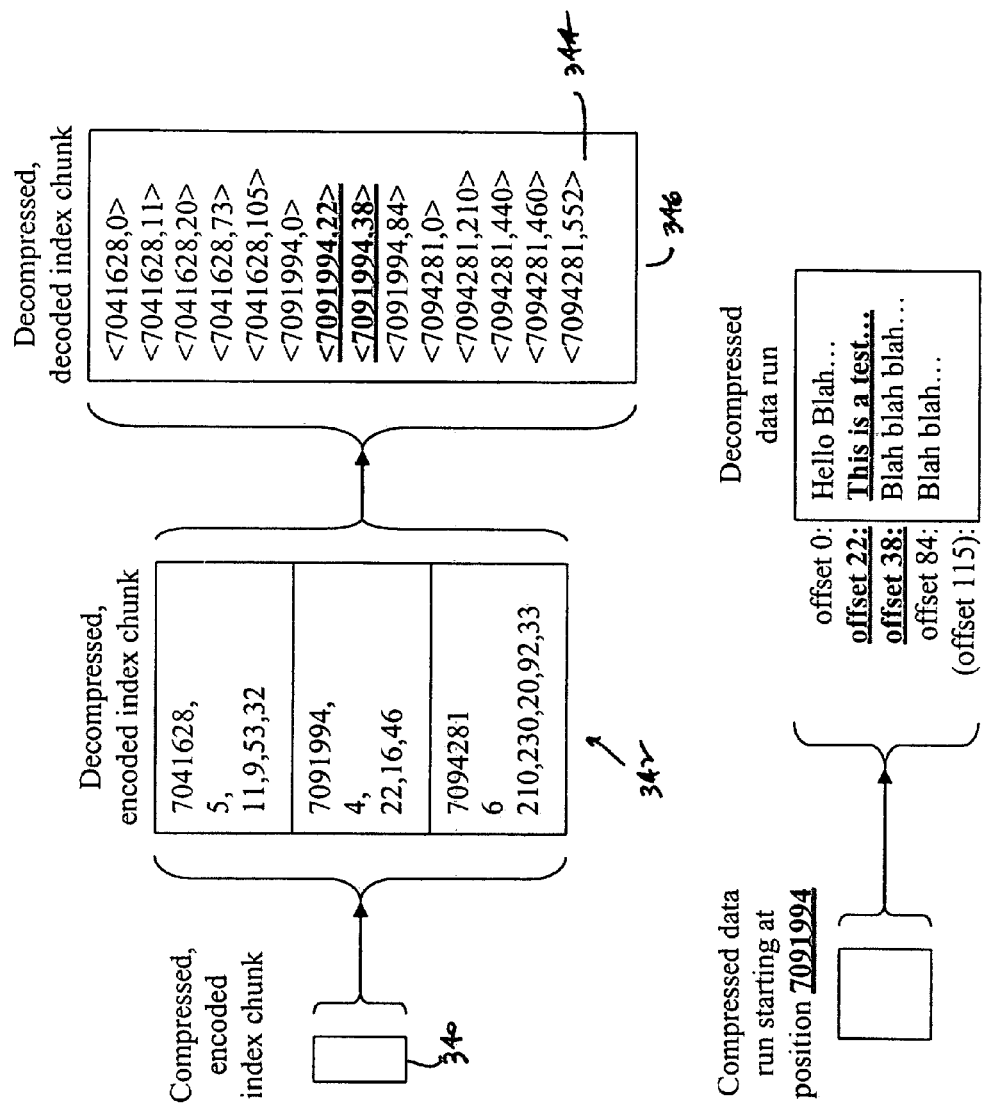

The second miodata file format version is more complex (see FIGS. 14 and 15). The data chunks discussed for the first file format are further divided (but never splitting a record) into data runs. Each data run is independently compressed 330 using the zlib compression library. In order to keep access to the miodata file responsive, we attempt to place a rough upper bound on how much time it takes to fetch a single record. To ensure this bound is satisfied, a data run is normally no bigger than 65,536 bytes plus one record. This can easily be read from disk and decompressed in a small fraction of a second. Using a significantly smaller data run size would force the compression operations to operate on smaller runs of bytes, potentially yielding less effective compression.

The pointers contained in an index chunk that point to records are no longer 8-byte integers but rather are pairs each consisting of the absolute position of a data run in the file and the offset at which the record starts within the decompressed contents of that data run.

Index chunks 336 undergo a form of run-length encoding prior to compression. A sequence of references into the same data run is encoded as <start-of-data-run, count, $size_1$, $size_2$, ... size[count−1]>. The start-of-data-run is 8 bytes, the count is 4 bytes, and each size is 4 bytes (limiting a single record to no more than 4 gigabytes). These sequences are concatenated together and compressed with the zlib library.

Decompression of an index chunk follows the reverse process (see FIG. 15). First, the compressed index chunk 340 is read from disk. It is then decompressed into another buffer 342. That buffer is converted from its sequence of <start-of-data-run, count, size1 ... size[count−1]> entries back into a sequence of <data-run, offset> pairs 344 in the decompressed, decoded index chunk 346.

Since data runs are never split across multiple index chunks, it follows that the last entry in an index chunk must refer to the last record in a data run. The data run's size is explicitly recorded with the data run for the purpose of being able to figure out how much data to feed to the decompression routine. Thus, a record's size is determined by one of three cases:

It's the last entry of an index chunk. Therefore it's also the last entry of the data run, so the record ends where the data run ends.

The next entry refers to a different data run. Again, since it's the last entry of a data run, the record ends where the data run ends.

The next entry is in the same data run. In this case, the record ends just before the start of the next record.

In any particular file the record sizes often fall within a fairly limited range. Even if record sizes vary wildly, some record sizes will be much more likely than others. Thus, encoding the index chunks prior to compression greatly increases the compression ratio (decompressed size/compressed size). This high compression can be particularly useful when working with many very short records (for example, two numeric strings representing database keys), because otherwise the space used for indexing might dominate the file size. Note that the extreme case is where all records are the same length, in which case the index information takes much less than one bit per record.

Caching is used extensively to reduce not only the cost of reading from disk but also the cost of decompression. There are several caches in play:

The operating system's disk cache.

A small associative cache of decompressed, decoded index chunks 350 (FIG. 14).

A small associative cache of decompressed data runs 360.

With these caches in place, scrolling through a miodata file is imperceptibly slower than scrolling through a plain file of fixed length or delimited records, despite the fact that sections of the file are being retrieved, decompressed, and decoded.

Figure 17:
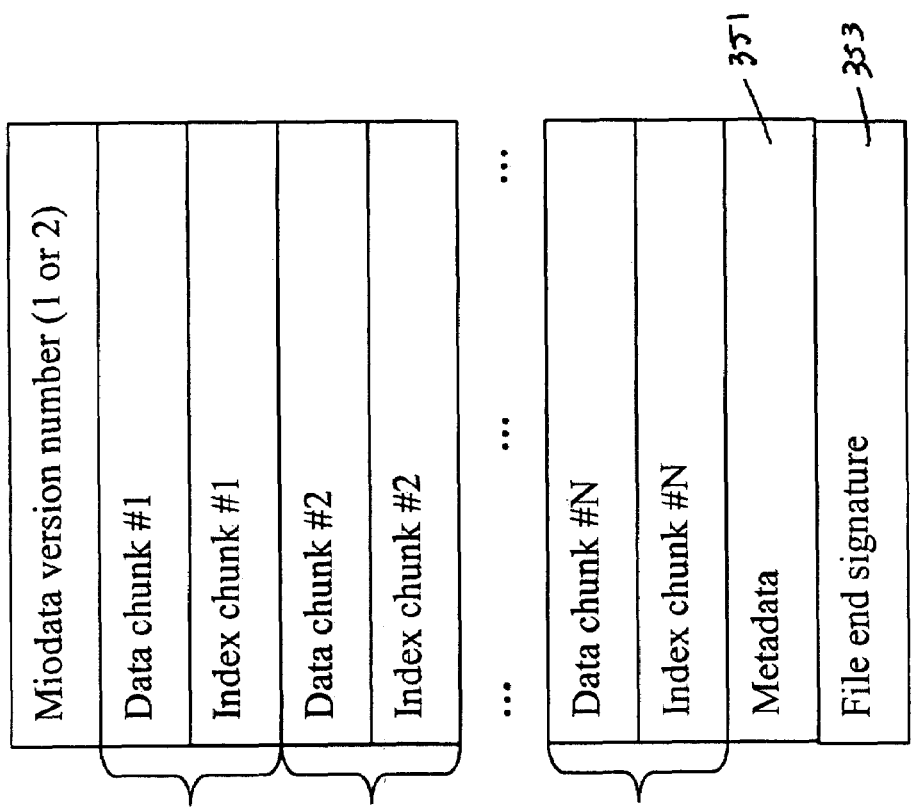

As shown in FIG. 17, in both miodata file formats, the index chunks and data chunks are interspersed in such a way that visiting the records causes the entire file to be read quasi-sequentially. This is to take advantage of the performance boost provided by existing prefetching mechanisms that are found in some operating systems and on some physical disk controllers. While the layout could be made even closer to purely sequential access by interchanging the data chunk and its corresponding index chunk, this must be traded against increased difficulty and time when creating a miodata file. If a typical record is 500 bytes and can be compressed to 50 bytes including overhead, then each data chunk would be ~320 KB on disk. Moving the disk head to the index chunk and back to the corresponding data chunk that precedes it should take ~6 ms on a 7200 RPM drive, limiting throughput to $$\frac{320{,}000 \text{ KB}}{16 \text{ ms}} \cong 20 \text{ MB/s},$$

not counting the physical transfer time. A prefetch mechanism more than 320 KB deep would avoid this limitation and only be limited by the transfer of the disk, not the seek speed. However, it's unlikely that decompression and other processing steps would proceed at this rate. Version 1 miodata data chunks would be 3.2 MB and be limited by seek speed to about 200 MB/s, well beyond the decompression rate.

In both variations of the miodata file format, there is a need to capture the list of file positions at which the index chunks occur. Since this is just a sequence of 8-byte pointers, and each chunk usually contains 65,536 entries in version 2 and 65,537 entries in version 1 (representing 65,536 records), we could store the list of index chunk addresses for ten billion records in just over one megabyte of main memory, which is an insignificant cost on modern hardware. Even a trillion records would cost just 100 MB of memory, still acceptable even on modern office computers. The list of positions of index chunks is part of the metadata area 351, and is read into memory in its entirety when the miodata file is opened.

The metadata 351 also contains a copy of the dynamic processing steps needed to parse and transform rows of data into a visual representation. The viewer uses this portion of the file's metadata to determine how to render the data.

At the end of the file is a sequence of signature bytes 353, which are checked before attempting to parse any other part of the file. The bytes are an ASCII representation of "eNd<lf>Mio<cr>sOft<lf><cr>PReSOrt<0><255>". These particular bytes were chosen for several reasons. They contain unusual combinations of carriage returns and line feeds, which would be irreparably mangled if the file were to be accidentally transferred by FTP in ASCII mode instead of binary mode. The final <255> byte is present to detect accidental conversion between code pages. The zero is present to protect against accidental interpretation of embedded zeros as an end-of-data indicator (as with the char* implementation in the C language). The word "miosoft" occurs (case mangled with a linefeed in the middle) because it is a registered trademark of MioSoft Corporation, and is therefore unlikely to occur in a file format defined by some other legal entity.

A feature of the viewer and tool is to provide a user the ability (with one pop-up click) to capture and view the number of occurrences of each value of a field and the location of all records containing that value in an arbitrary very large file. The feature works even when the number of distinct values present is very large (theoretical limit $2^{64}$).

Figure 16:
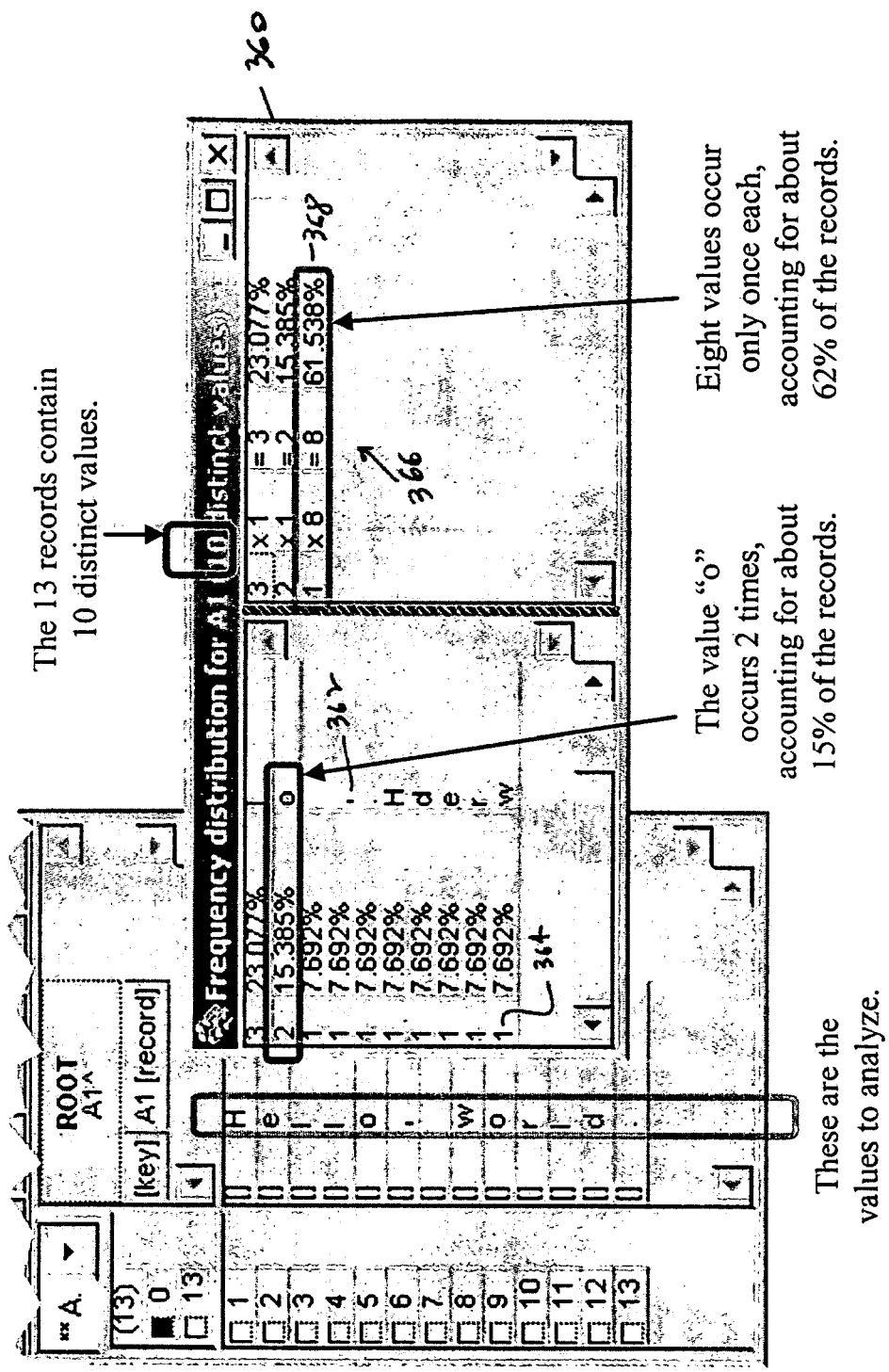

One can select a column and perform a frequency analysis on it. As shown in FIG. 16, that causes a new window 360 to be opened showing the frequency analysis. The left half of the window contains an entry 362 for each distinct value that occurred in that column. The entry displays the value and the number of times 364 it occurs (its frequency). The entries are sorted by descending frequency. Faint separator lines are drawn between successive entries that have different frequencies.

In the right half of the frequency analysis window is what we call the meta-frequency. It contains a list 366 of all frequencies that occurred in the left half entries, sorted the same way as on the left. Each row 368 of the right half represents a summary of a contiguous subsequence of rows from the left half that all have the same frequency (and therefore no separator lines between them). The right half contains at most as many entries as there are in the left half.

Figure 18:
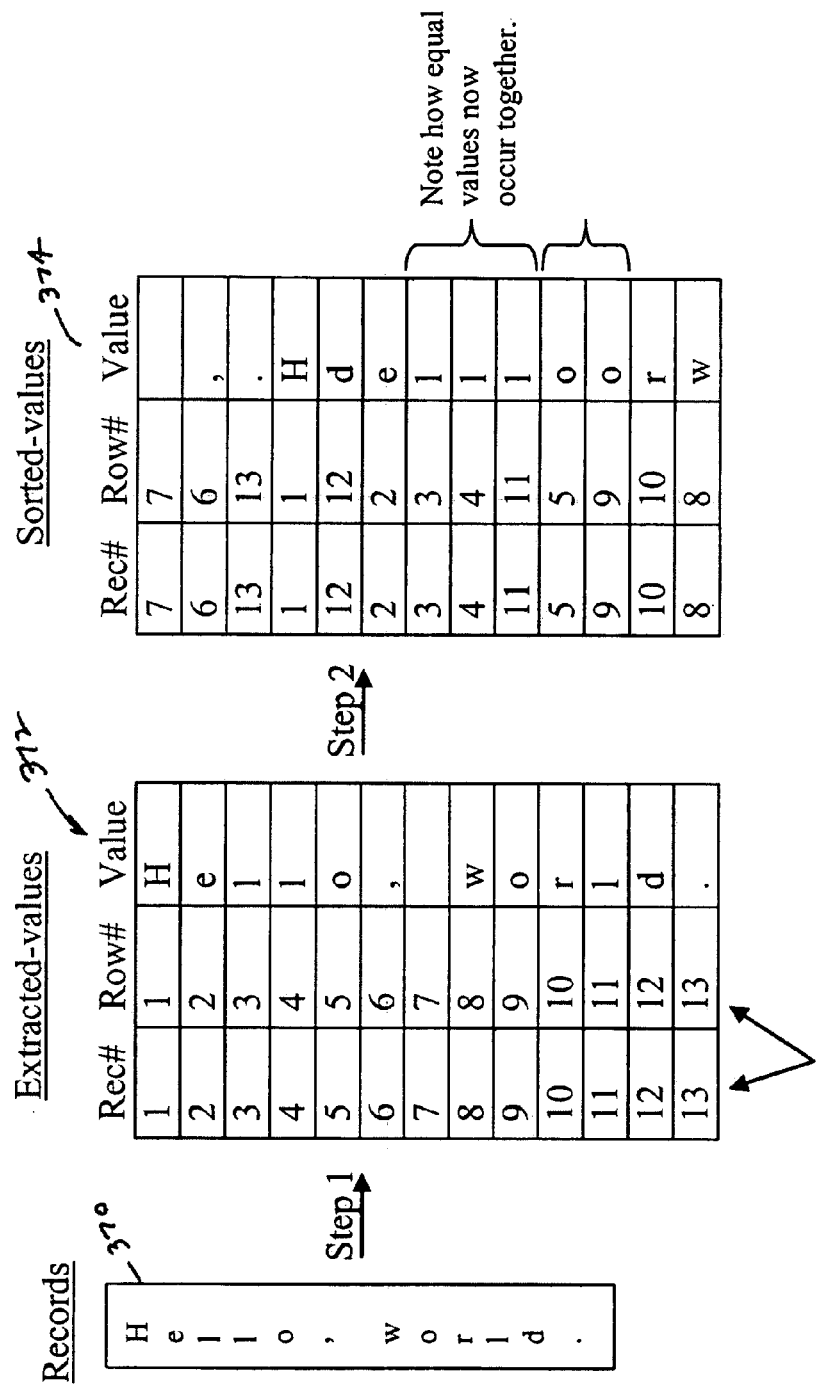

In order to support frequency analysis in the presence of many billions of records, the frequency analysis writes information into files, which are dynamically read while scrolling the left and right areas of the frequency analysis window. Here are the steps:

As shown in FIG. 18, each record 370 is visited. The value is extracted for the selected column, and the tuple <record-number, row-number, value> is written to a file 372 called extracted-values. The record-number and row-number will be the same if all records are visible, but if some have been filtered out, the two numbers will be different. The record-number represents which record of the file the value is from, and the row-number is used to express how far from the top of the visible list it occurs. Even in the presence of filtering these are monotonically correlated—an increase in the record-number always corresponds with an increase in the row-number and vice versa. In the presence of on-screen sorting, however, this correlation no longer holds.

These extracted-values tuples are then sorted by value to create a sorted-values file 374. The tuples are the same as for extracted-values, just reordered by ascending value.

As shown in FIG. 19, the sorted-values file is then scanned, creating another file, values-with-counts 376. This file consists of triples 378 of the form <count, value, run-start>, where count is the number of occurrences of the value (determined by a counter that is zeroed every time a different value is encountered in the next sorted-values tuple), value is the value from the sorted-values tuple, and run-start is the file position within sorted-values at which the first tuple with that value occurred.

The values-with-counts file is then sorted by decreasing count to form the sorted-counts-and-values file 380.

Figure 20:
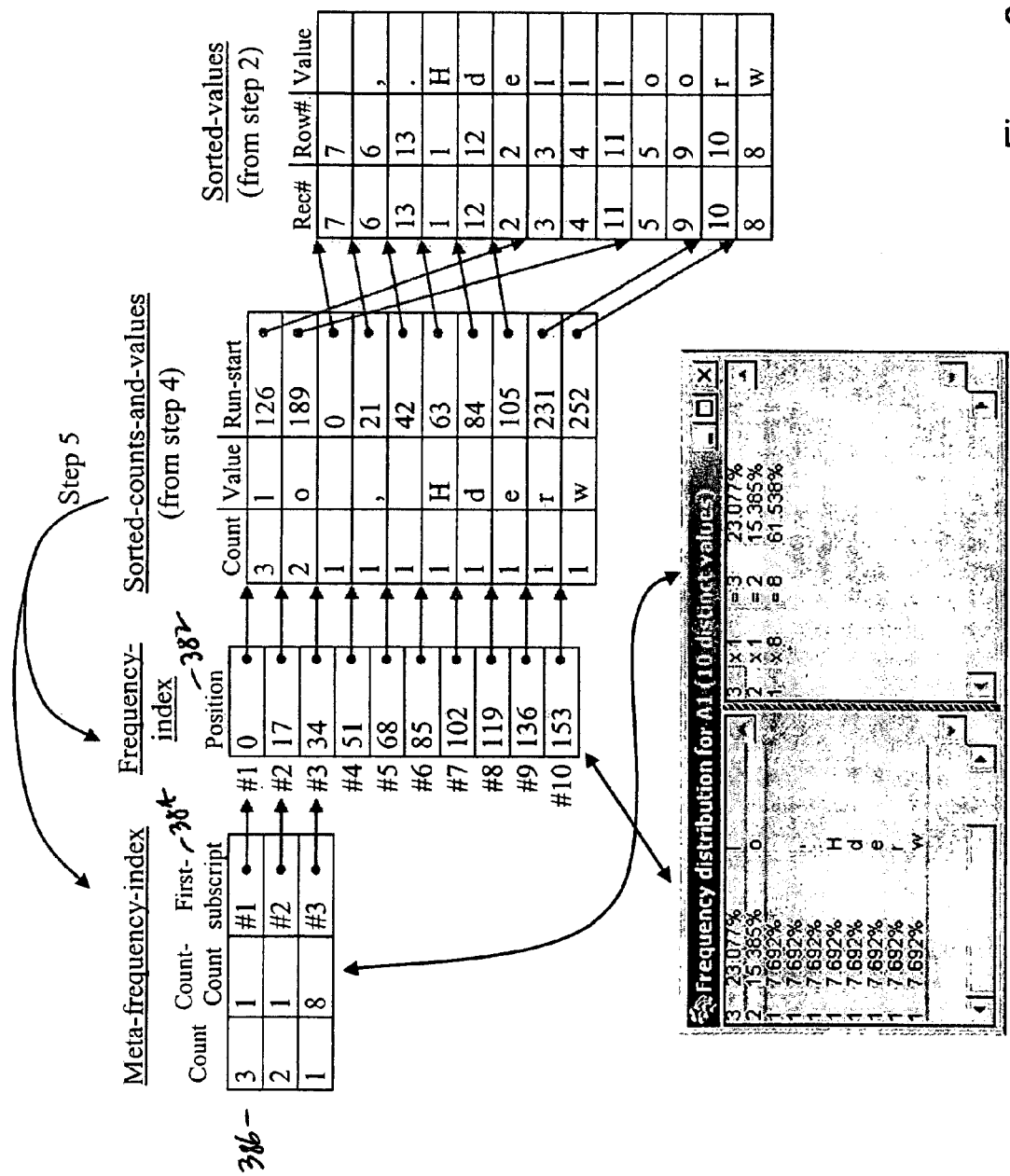

As shown in FIG. 20, the sorted-counts-and-values file is scanned. For each tuple, that tuple's position in the file is written (as an 8-byte integer) to a frequency-index file 382. At the same time, a meta-frequency-index file 384 is created that contains fixed-size tuples 386 of the form <count-count, count, subscript-of-first-entry-with-given-count>.

The frequency-index file allows the left side of the frequency analysis window to be rendered. To draw the $N^{th}$ line in the left half, we read 8 bytes from the frequency-index file starting at N×8, then use that as a file pointer into the sorted-counts-and-values file, which contains both the count and the value to display on that line.

The meta-frequency-index file allows the right half of the frequency analysis window to be rendered as well. The $N^{th}$ line of the right half is found by fetching the $N^{th}$ (fixed-size) tuple from the meta-frequency-index file. The "count" part of the tuple denotes how many times a data value occurred, and the "count-count" part denotes how many times that particular number of occurrences occurred. Multiplying them gives a useful number, the total number of records represented by that line.

We intercept the operating system's repaint events for both the left half and the right half of the frequency analysis window, using the above technique to determine what to draw for each visible row. This is necessary to ensure that an enormous file of mostly unique values does not consume all memory just to keep track of what to display on each line.

The viewer and tool also provide the ability to use step 5 of FIG. 20 to mark records with either a particular value or all values with a particular frequency. Once marked, drill-down and further frequencies are possible.

Figure 21:
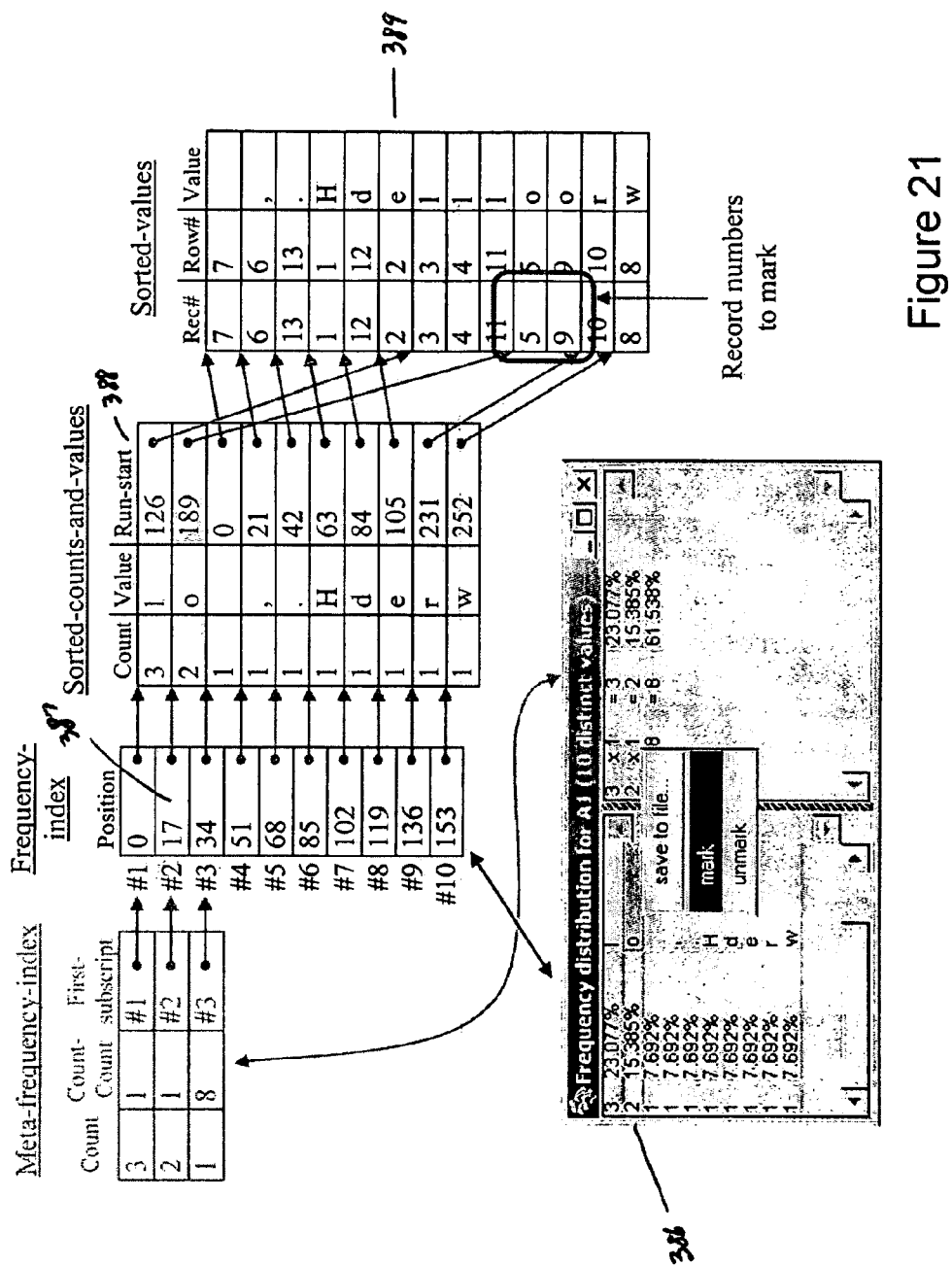

As show in FIG. 21, you can select a line 386 in the left half of the window and then select mark from the pop-up menu. The selected row on the left half of the window is looked up 387 in the frequency-index file and then the sorted-counts-and-values file. We then have a tuple of the form <count, value, run-start>. We use run-start 388 as the file position 389 within sorted-values, and read count tuples from it. Those tuples contain the record numbers of the records that contained the selected data value, so they can be immediately used as a subscript into the marking bit vector in order to mark those rows. An unmark option does the same thing except that it unmarks the rows instead of marking them.

Figure 22:
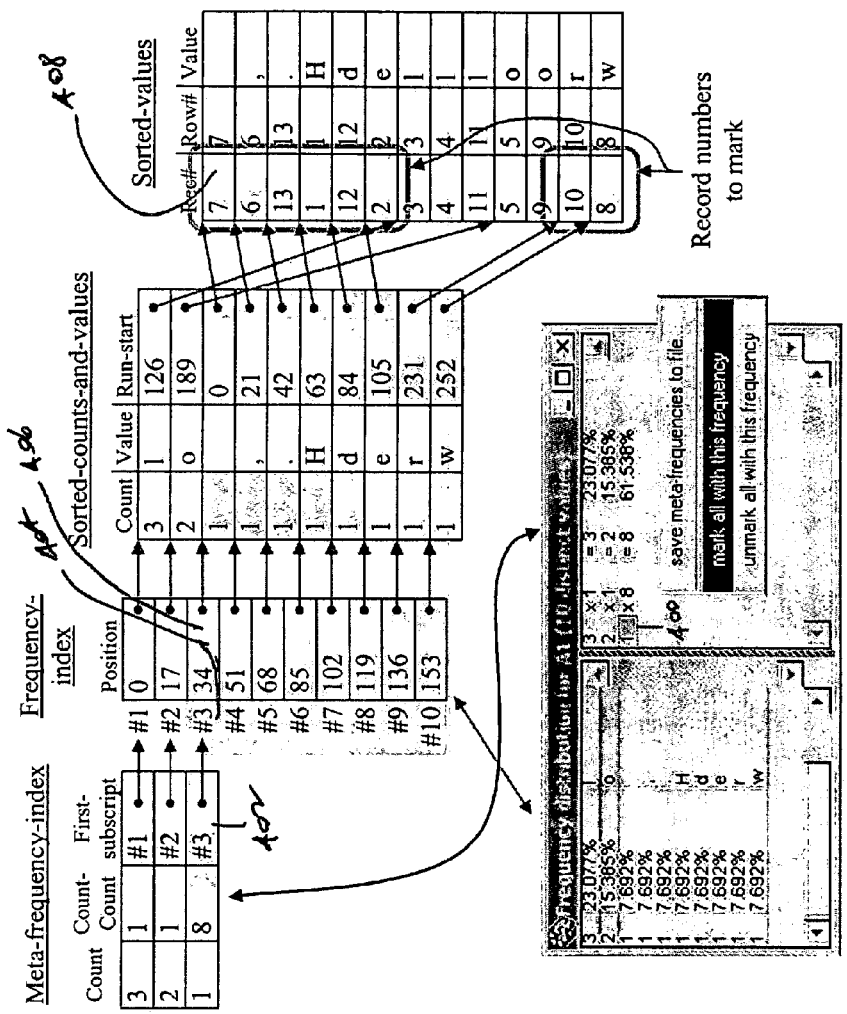

As shown in FIG. 22, if you select a line 400 in the right half of the window and select mark from its pop-up menu, you will be able to mark every row that contains a value that occurred a given number of times. The meta-frequency-index file is consulted, producing a tuple of the form <count, count-count, subscript-of-first-entry-with-given-count>. The subscript-of-first-entry-with-given-count 402 is used to get an integer 404 from the frequency-index file, which gives us a starting point 406 in the sorted-counts-and-values file. We read count× countCount tuples from the sorted-counts-and-values file, recording the record number from each in a temporary file. We then sort the temporary file and iterate over it in ascending record-number order, marking the indicated record numbers 408. We do this to avoid thrashing the marking bit vector with random writes, in case it's a very large file and the bit vector must reside on disk. Again, an unmark option does the same thing, except unmarking rows instead of marking them.

There can be many frequency analysis windows open simultaneously, and each one retains the independent ability to mark or unmark by either frequency (left side) or meta-frequency (right side). As an example, you could perform a frequency analysis on a list of customers by first name and by last name. You could mark all records with first names that occurred once, and then mark all records with last names that occurred once. This in effect would mark all customers with either a globally unique first name or a globally unique last name.

A wide variety of hardware, software, and firmware can be used to implement the system described above, including various kinds of available computers, operating systems, memory, storage, and communication facilities.

Figure 23:
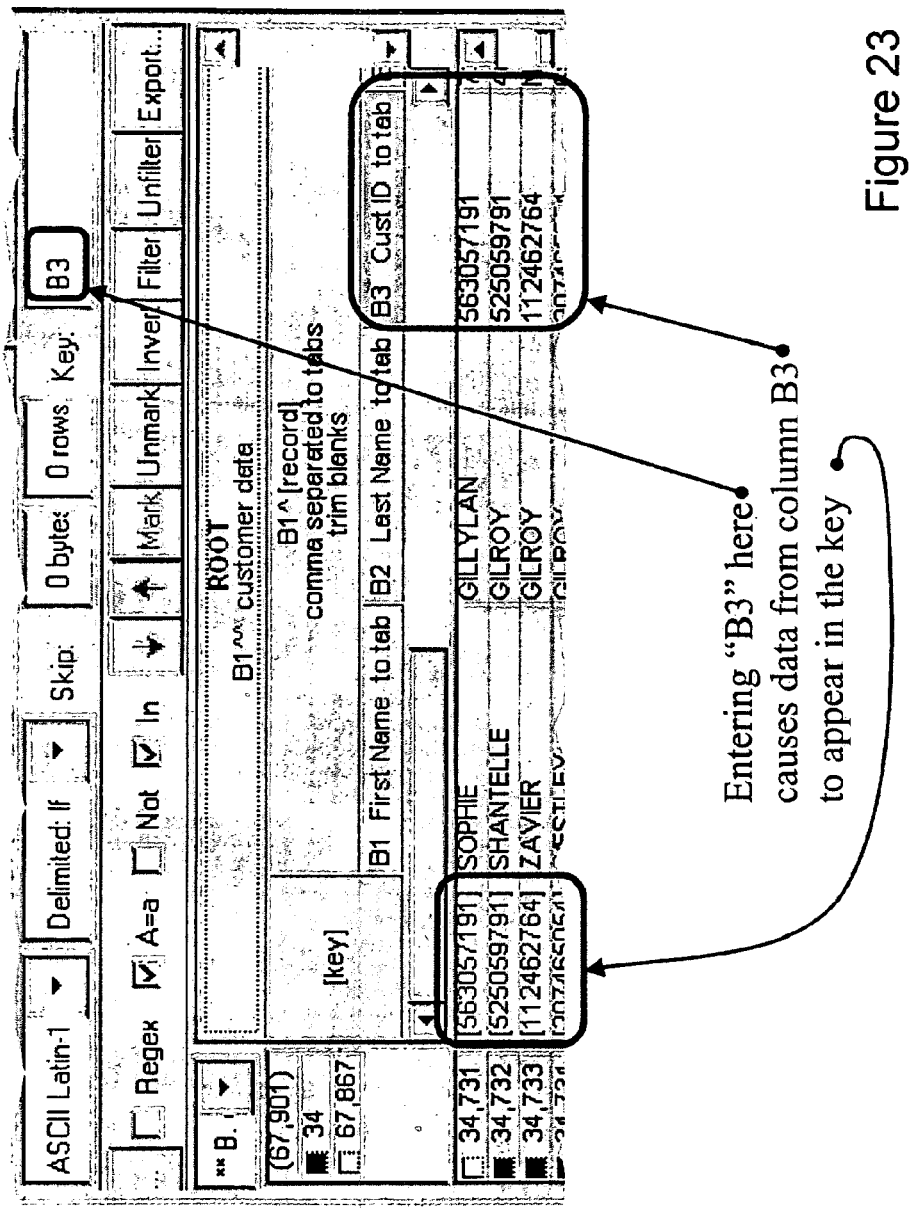

As shown in FIG. 23, a user can analyze multiple files and their relationships. In the same way that a multi-column edit provides a transformed view of multiple fields of a file, one can also work with multiple files, each with its own distinct hierarchy of processing steps.

To establish a meaningful relationship between or among files, we define the notion of a key. Each record of a file has a key value, and the record's file specifies how to construct the key value from the record. In particular, the file format has a list of columns that provide key components that will be combined to form a record's key value.

Figure 24:
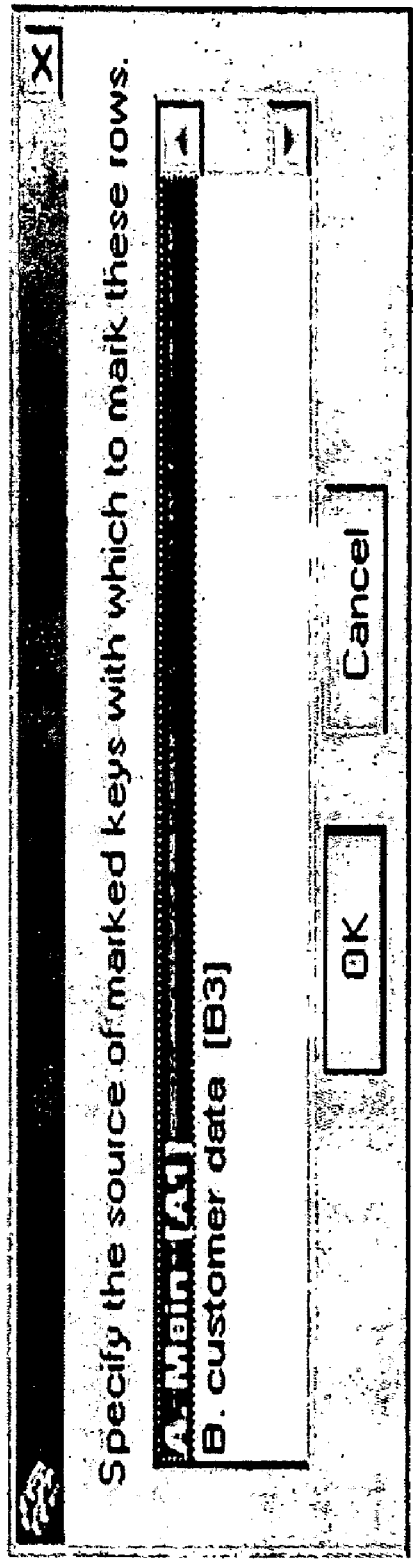

The user can cause to be marked one or more rows in one of the files (called a source file), using any of the mechanisms described previously. As shown in FIG. 24, after switching to a different file (the target file) and selecting the menu option "mark across join", the user is then asked to choose the source file. Each record in the target file that shares a key value in common with a marked source record will then be marked in the target file.

Figure 25:
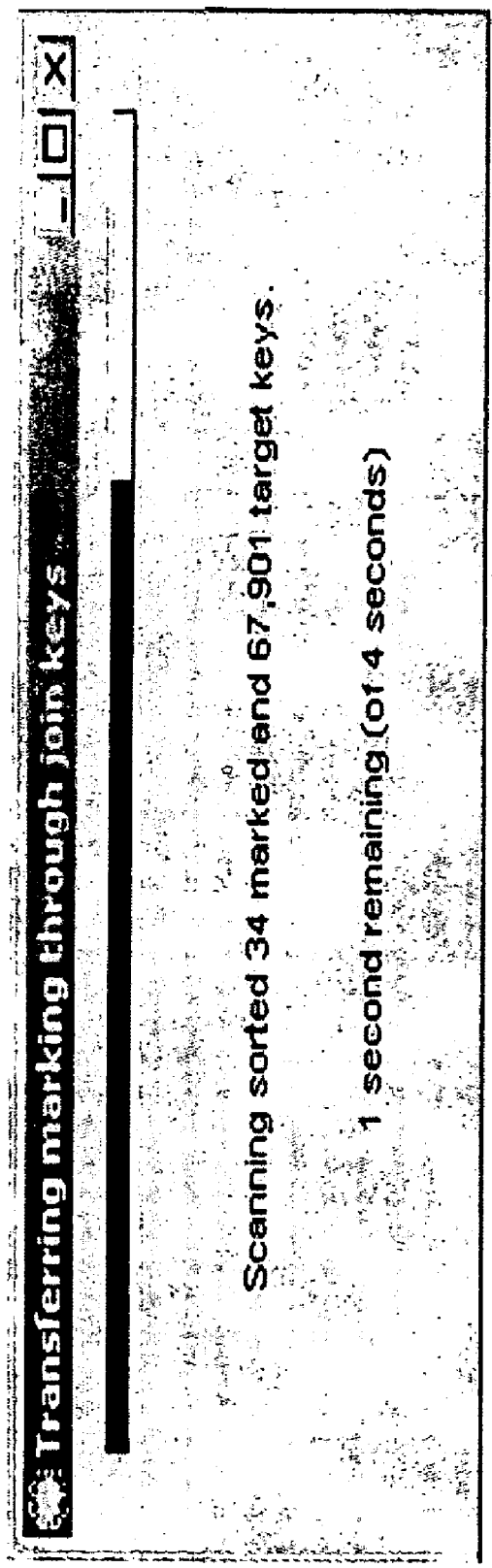

As shown in FIG. 25, the marking in the target file is accomplished efficiently without limiting the maximum scale of file that can be marked. The first step in the marking is to extract marked key values of the source file and sort them to produce a file of marked source keys that can be efficiently read in ascending key order as shown in FIG. 26.

The next step is to extract <key, record#> pairs from the target file for each visible row. For maximum efficiency the visible rows are visited in physical record order, even if the file has been sorted and/or filtered. The <key, record#> pairs are then sorted so that they can be efficiently read in ascending key order as shown in FIG. 27.

The file of marked source keys and the file of target <key, record#> pairs are then scanned together in ascending key order. For each key that occurs in the source keys file, the process scans forward in the target pair file to the first pair whose key is greater than or equal to the source key. The target pairs are scanned until the target key value exceeds the source key value. For each one, the record number is written to a file of target record numbers to mark. Finally, the current source key is skipped and the next source key is processed and so on until the source keys have been exhausted.

The resulting file contains all target record numbers that should be marked. That file is sorted by record number and the rows in the target file are marked. This final sort is only necessary if the total number of rows in the target file is so large that the marking bits are stored on disk instead of in memory (i.e., in some implementations, more than 160 million rows).

Other implementations are within the scope of the following claims.

Although the system has been described by examples that involve viewing and analysis of records of a database on a computer, a wide variety of other implementations are possible. The file to be viewed and analysed may contain simply a series of records that are accumulated into a streaming file, for example, a set of error records in an error log, or a series of data readings from a processing plant. Any file that contains distinguishable records that include a common field can be used. In addition, the platform for viewing and analysis need not be a standalone general purpose computer using programmed software but could be a wide variety of devices including handheld devices, dedicated hardware, hardwired devices, or computers that serve as clients within a networked environment. Any device that is capable of processing such a file and providing a user interface (whether simple or rich) for viewing and analyzing the records of the file could be used.

Page: 28

In addition, the responsibilities of presenting the data to the user and of accessing input and generated files may be delegated to two distinct computers or devices connected by a network. We may call these the user-side device and the data-side device. Because the data presented to the user is a tiny subset of the total bulk of data, the bandwidth requirement for communication in the network is relatively small. The transmitted data is almost entirely textual, allowing a high degree of compression, further reducing the bandwidth requirement. Finally, a typical interaction is for the user to scroll or resize a window, which can cause a single request for a range of data to be transmitted from the user-side device to the data-side device and a single compressed response to be transmitted back. This provides a high degree of compression by compressing as much data as possible in one step, allowing inter-record redundancy to be exploited. It also reduces the number of round-trip network communications (to exactly one), thus reducing the network's contribution to the total latency between the user's action (e.g., clicking on a scroll bar) and the display of the final effect (showing the data that is visible at the new scroll position). Another implementation variant is to have multiple data-side devices, such as a grid of computers, each storing locally a portion of the total data.

What is claimed is:

1. A method comprising:
   with respect to a file stored on a storage device, the file containing a stream of characters, at least some portions of the stream being data pieces,
   enabling a user to indicate data pieces of the file that the user wishes to view, and
   using supplemental information about locations at which the data pieces are stored on the storage device, the supplemental information being generated based on an analysis of the file to enable the user to view a portion of the indicated data pieces that a machine is capable of displaying at one time, the amount of time required to enable the user to view the portion after the data pieces have been indicated being essentially independent of the number of data pieces in the file.

2. The method of claim 1 in which enabling the user to indicate the data pieces that the user wishes to view includes enabling the user to cause the data pieces that the user wishes to view to be marked.

3. The method of claim 2 in which enabling the user to indicate the data pieces that the user wishes to view includes enabling the user to filter marked data pieces.

4. The method of claim 3 in which enabling the user to indicate the data pieces that the user wishes to view includes enabling the user to cause the filtered data pieces to be unmarked.

5. The method of claim 4 in which enabling the user to indicate the data pieces that the user wishes to view includes enabling the user to cause the filtered data pieces to be marked.

6. The method of claim 1 in which enabling the user to indicate the data pieces that the user wishes to view includes enabling the user to perform sequences and iterations of two or more of the following actions: causing the data pieces to be marked, filtering the data pieces, causing the data pieces to be unmarked, causing the filtered data pieces to be marked.

7. The method of claim 6 also including enabling the user to cause marking of the marked or unmarked data pieces to be inverted.

8. The method of claim 1 also including enabling a user to initiate analytical steps on the data pieces of the file.

9. The method of claim 8 in which the analytical steps comprise generating a frequency distribution of the data pieces.

10. The method of claim 9 in which enabling the user to indicate the data pieces that the user wishes to view includes enabling the user to perform sequences and iterations of two or more of the following actions in combination with the generating of the frequency distribution: causing the data pieces to be marked, causing the data pieces to be filtered, causing the data pieces to be unmarked, causing the filtered data pieces to be marked.

11. The method of claim 9 in which the analytical steps comprise generating a meta-frequency distribution of entries in the frequency distribution.

12. The method of claim 11 in which enabling the user to indicate the data pieces that the user wishes to view includes enabling the user to perform sequences and iterations of two or more of the following actions in combination with the generating of the meta-frequency distribution: causing the data pieces to be marked, filtering the data pieces, causing the data pieces to be unmarked, causing the filtered data pieces to be marked.

13. The method of claim 1 in which enabling the user to indicate the data pieces that the user wishes to view includes enabling the user to scroll from one set of displayed data pieces to other displayed data pieces.

14. The method of claim 1 in which enabling the user to indicate the data pieces that the user wishes to view includes enabling the user to sort the data pieces of the file.

15. The method of claim 1 in which enabling the user to indicate the data pieces that the user wishes to view includes enabling the user to scroll to data pieces not currently displayed.

16. The method of claim 1 in which enabling the user to indicate the data pieces that the user wishes to view includes enabling the user to cause some of the data pieces of the file to be marked.

17. The method of claim 1 in which the supplemental information comprises an index file.

18. The method of claim 1 in which the data pieces of the file are delimited.

19. The method of claim 18 in which the data pieces are delimited by length, one or more XML tags, or other delimiters.

20. The method of claim 19 in which the delimiters are nested to any arbitrary degree.

21. The method of claim 1 in which the portion of the data pieces that the machine is capable of displaying at one time is limited by a width of a display window, and the action of receiving the indication from the user includes receiving an indication from the user to scroll displayed information horizontally.

22. The method of claim 1 in which the number of data pieces in the file exceeds one million.

23. The method of claim 1 in which the number of data pieces in the file exceeds one billion.

24. The method of claim 22 or 23 in which the time required to enable the user to view the portion after the indication has been received is less than one second.

25. The method of claim 1 in which the supplemental information is persistent.

26. The method of claim 1 in which the supplemental information associates a number of each record with a starting location of the record in the file.

27. A method comprising:
with respect to a file stored on a storage device, the file containing a stream of characters, at least some portions of the stream being data pieces,
using supplemental information about locations at which the data pieces are stored on the storage device, the supplemental information being generated based on an analysis of the file, to enable a user to cause marking of data pieces of the file that the user wishes to view, the data pieces that are caused to be marked having arbitrary locations in the file.

28. The method of claim 27 in which enabling the user to cause the data pieces that the user wishes to view to be marked includes enabling the user to cause the marked data pieces to be filtered.

29. The method of claim 28 in which enabling the user to cause the data pieces that the user wishes to view to be marked includes enabling the user to cause the filtered data pieces to be unmarked.

30. The method of claim 29 in which enabling the user to cause the data pieces that the user wishes to view to be marked includes enabling the user to cause the filtered data pieces to be marked.

31. The method of claim 27 in which enabling the user to cause the data pieces that the user wishes to view to be marked includes enabling the user to perform sequences and iterations of two or more of the following actions: causing the data pieces to be marked, filtering the data pieces, causing the data pieces to be unmarked, causing the filtered data pieces to be marked.

32. The method of claim 31 also including enabling the user to cause marking of the marked or unmarked data pieces to be inverted.

33. The method of claim 27 also including enabling the user to initiate analytical steps on the data pieces of the file.

34. The method of claim 33 in which the analytical steps comprise generating a frequency distribution of the data pieces.

35. The method of claim 34 in which enabling the user to cause the data pieces that the user wishes to view to be marked includes enabling the user to perform sequences and iterations of two or more of the following actions in combination with the generating of the frequency distribution: causing the data pieces to be marked, filtering the data pieces, causing the data pieces to be unmarked, causing the filtered data pieces to be marked.

36. The method of claim 34 in which the analytical steps comprise generating a meta-frequency distribution of entries in the frequency distribution.

37. The method of claim 36 in which enabling the user to cause the data pieces that the user wishes to view to be marked includes enabling the user to perform sequences and iterations of two or more of the following actions in combination with the generating of the meta-frequency distribution: causing the data pieces to be marked, filtering the data pieces, causing the data pieces to be unmarked, causing the filtered data pieces to be marked.

38. The method of claim 27 also including
enabling the user to change the data pieces that are to be marked.

39. The method of claim 27 also including
enabling the user to view a portion of the marked data records that the user wishes to view that a machine is capable of displaying at one time, the amount of time required to enable the user to view the portion after the user has marked the data pieces being essentially independent of the number of data pieces in the file.

40. The method of claim 27 in which the user is enabled to cause the data pieces to be marked by specifying filter criteria, and the time required to mark the data pieces after the filter criteria are specified is essentially independent of the number of data pieces in the file.

41. The method of claim 27 also comprising
enabling the user to take an action with respect to the marked data pieces.

42. The method of claim 41 in which the action comprises selecting additional data pieces.

43. The method of claim 27 in which the number of the data pieces in the file exceeds one million.

44. The method of claim 27 in which the number of the data pieces in the file exceeds one billion.

45. A method comprising:
enabling a user to cause marking of data pieces that the user wishes to view,
enabling the user to apply a filter to cause only the marked data pieces to be subjected to a subsequent action, and enabling the user to cause marking of a subset of the filtered data pieces.

46. The method of claim 45 in which the file is too large to be stored, as a whole, in a memory that is used by the machine in accessing the data pieces in response to the user.

47. The method of claim 45 in which enabling the user to cause marking of the data pieces that the user wishes to view includes enabling the user to cause the filtered data pieces to be unmarked.

48. The method of claim 45 in which enabling the user to cause marking of the data pieces that the user wishes to view includes enabling the user to cause the filtered data pieces to be marked.

49. The method of claim 48 in which enabling the user to cause marking of the data pieces that the user wishes to view includes enabling the user to perform sequences and iterations of two or more of the following actions: causing the data pieces to be marked, filtering the data pieces, causing the data pieces to be unmarked, causing the filtered data pieces to be marked.

50. The method of claim 49 also including enabling the user to cause marking of the marked or unmarked data pieces to be inverted.

51. The method of claim 49 also including enabling the user to initiate analytical steps on the data pieces of the file.

52. The method of claim 51 in which the analytical steps comprise generating a frequency distribution of the data pieces.

53. The method of claim 45 in which enabling the user to cause marking of the data pieces that the user wishes to view includes enabling the user to perform sequences and iterations of two or more of the following actions in combination with the generating of the frequency distribution: causing the data pieces to be marked, filtering the data pieces, causing the data pieces to be unmarked, causing the filtered data pieces to be marked.

54. The method of claim 45 in which the analytical steps comprise generating a meta-frequency distribution of entries in the frequency distribution.

55. The method of claim 54 in which enabling the user to cause marking of the data pieces that the user wishes to view includes enabling the user to perform sequences and iterations of two or more of the following actions in combination with the generating of the meta-frequency distribution: causing the data pieces to be marked, filtering the data pieces, causing the data pieces to be unmarked, causing the filtered data pieces to be marked.

56. The method of claim 45 in which the data pieces that the user wishes to view have arbitrary locations in the file.

57. The method of claim 45 in which the amount of time required to apply the filter is essentially independent of the number of the data pieces in the file.

58. The method of claim 45 in which the number of the marked data pieces is too large to be stored, as a whole, in the memory.

59. The method of claim 45 in which the number of the data pieces exceeds one million.

60. The method of claim 45 in which the number of the data pieces exceeds one billion.

61. A method comprising:
with respect to a file stored on a storage device, the file containing a stream of characters, at least some portions of the stream being data pieces,
analyzing the file to produce supplemental information about locations at which the data pieces are stored on the storage device the supplemental information enabling the machine to operate on the data pieces in response to interactions of a user in an amount of time that is essentially independent of the number of data pieces in the file, and
forming an enhanced file that includes the data pieces and the supplemental information and can be used later to permit the machine to operate on the data pieces in response to the interactions of the user without requiring a recreation of the supplemental information.

62. The method of claim 61 in which the data pieces appear in the enhanced file as groups of data containing representations of the data pieces.

63. The method of claim 61 in which the supplemental information appears in the enhanced file as groups of information.

64. The method of claim 61 in which the supplemental information is interleaved with the data pieces.

65. The method of claim 61 in which the supplemental information includes metadata.

66. The method of claim 61 in which the supplemental information includes frequency data.

67. A method comprising:
analyzing data pieces of a file, the data pieces having values for one or more fields, to determine the number of occurrences of each value of at least one of the fields, and
enabling a user to view a number representing the number of occurrences of each value of the field and the locations of all data pieces containing that value in the file, there being as many as a billion distinct values of the field.

68. The method of claim 67 in which the number of distinct values of the field is as large as $2^{**}64$.

69. The method of claim 67 in which the user is enabled to view the number of occurrences and the locations of the data pieces in a scrollable window of a user interface.

70. A method comprising:
analyzing data pieces of a file, the data pieces having values for one or more fields, to determine the number of occurrences of each value of at least one of the fields, and
enabling a user to view a number representing the number of occurrences of each value of the field and the locations of all data pieces containing that value in the file, and
enabling the user to cause the data pieces to be marked based on information viewed by the user.

71. The method of claim 70 in which the user is enabled to cause the data pieces to be marked based on at least one value or the number of occurrences of one or more values.

72. The method of claim 70 in which the user is enabled to cause the data pieces to be marked that contain a particular value.

73. The method of claim 70 in which the user is enabled to cause the data pieces to be marked that contain all values that have the same number of appearances in the data pieces.

74. The method of claim 70 also including
enabling the user to control additional marking and filtering of the data pieces.

75. A method comprising:
enabling a user to indicate, as a key, a field in each of at least two different files expressed in potentially two different arbitrary file formats and to cause data pieces that the user wishes to view to be marked in at least one of the files, and
automatically marking in at least a second of the files data pieces for which a value of the key corresponds to a value of the key of a marked data piece of the one file.

76. The method of claim 75 in which the fields that are identified as keys in the two files are different in their structure or location in their respective files.

77. The method of claim 75 in which each of the keys comprises a composite key comprised of possible non-consecutive fields of the file.

78. The method of claim 77 in which one of the composite keys comprises a partial composite key relative to the other of the composite keys.

79. The method of claim 75 in which enabling the user to cause the data pieces to be marked includes enabling the user to perform sequences and iterations of two or more of the following actions: causing the data pieces to be marked, causing the data pieces to be filtered, causing the data pieces to be unmarked, causing the filtered data pieces to be marked.

80. The method of claim 75 also including automatically marking in at least a third file data pieces for which a value of the key corresponds to a value of the key of the second file.

81. The method of claim 80 in which, prior to the automatic marking of the data pieces in the third file, a different field of the second file is identified as a key, and a field in the third file that corresponds to the different field of the second file is identified as a key.

82. The method of claim 75 in which at least one of the files is too large to be stored, as a whole, in a memory that is used by the machine in accessing the data pieces in response to the user.

* * * * *

UNITED STATES PATENT AND TRADEMARK OFFICE
CERTIFICATE OF CORRECTION

PATENT NO. : 7,512,610 B1  
APPLICATION NO. : 11/241571  
DATED : March 31, 2009  
INVENTOR(S) : Albert B. Barabas Page 1 of 1

It is certified that error appears in the above-identified patent and that said Letters Patent is hereby corrected as shown below:

Column 19, Claim 61, Line 66: Delete "device" and insert -- device, --.

Signed and Sealed this

Second Day of June, 2009

JOHN DOLL  
*Acting Director of the United States Patent and Trademark Office*